US 9,959,450 B2

(12) United States Patent
Suzuki et al.

(10) Patent No.: US 9,959,450 B2
(45) Date of Patent: *May 1, 2018

(54) APPARATUS, METHOD AND PROGRAM FOR 3D DATA ANALYSIS, AND MICROPARTICLE ANALYSIS SYSTEM

(71) Applicant: Sony Corporation, Tokyo (JP)

(72) Inventors: Shunsuke Suzuki, Kanagawa (JP); Ryo Fukazawa, Kanagawa (JP); Atsuo Fujimaki, Tokyo (JP); Wataru Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/644,042

(22) Filed: Jul. 7, 2017

(65) Prior Publication Data

US 2018/0012063 A1   Jan. 11, 2018

Related U.S. Application Data

(63) Continuation of application No. 14/349,893, filed as application No. PCT/JP2012/006428 on Oct. 5, 2012, now Pat. No. 9,704,019.

(30) Foreign Application Priority Data

Oct. 14, 2011  (JP) .................................. 2011-226675

(51) Int. Cl.
*G06K 9/00* (2006.01)
*G06T 19/00* (2011.01)

(52) U.S. Cl.
CPC .......... *G06K 9/00147* (2013.01); *G06T 19/00* (2013.01)

(58) Field of Classification Search
CPC .............. G06T 11/206; G06T 2200/24; G06T 2210/12; G06T 19/00; A61B 8/463; A61B 5/1032; A61B 2019/507; G06K 9/00147
See application file for complete search history.

(56) References Cited

U.S. PATENT DOCUMENTS 5,656,446 A    8/1997 Anderson
5,848,425 A   12/1998 Lowry et al.
(Continued)

FOREIGN PATENT DOCUMENTS

JP    10-318904    12/1998
JP    2006-017497    1/2006

OTHER PUBLICATIONS

Communication Pursuant to Article 94(3) EPC for European App. No. 12 813 998.7-1908, dated May 23, 2017 (5 pages).
(Continued)

*Primary Examiner* — Siamak Harandi
*Assistant Examiner* — Carol Wang
(74) *Attorney, Agent, or Firm* — K&L Gates LLP

(57) ABSTRACT

In an example embodiment, may be embodied in a data analysis apparatus comprises a control unit configured to provide data representative of a three dimensional image, the three dimensional image including at least a three dimensional coordinate space which includes at least one plane that divides the three dimensional coordinate space into at least two regions, a display unit configured to produce the three dimensional image based on the data representative of the three dimensional image, and an input unit configured to provide data representative of at least one of a movement and a position of the at least one plane. In other example embodiments, the present disclosure may be embodied in a data analysis server, a data analysis system, and/or a computer readable medium.

15 Claims, 15 Drawing Sheets

(56) References Cited

U.S. PATENT DOCUMENTS

| | | |
|---|---|---|
| 2003/0184730 A1 | 10/2003 | Price |
| 2004/0240321 A1 | 12/2004 | Canning |
| 2005/0221399 A1 | 10/2005 | Nakano et al. |
| 2006/0079776 A1 | 4/2006 | Karasawa |
| 2009/0044181 A1 | 2/2009 | Vrba et al. |
| 2010/0014741 A1 | 1/2010 | Banville et al. |
| 2010/0069725 A1 | 3/2010 | Al-Ali |
| 2011/0050686 A1 | 3/2011 | Nojima et al. |
| 2012/0079431 A1 | 3/2012 | Toso |
| 2012/0135405 A1 | 5/2012 | Toumbas et al. |

OTHER PUBLICATIONS

Japanese Office Action dated Mar. 29, 2016, for corresponding Japanese Appln. No. 2011-226675 (7 pages).

Inoue, Basic characteristics of stereoscopic 3D display; Faculty of Information Technology, Kanagawa Institute of Technology.

Altoft, Data Visualization for ESM and ELINT Visualizing 3D and Hyper Dimensional Data; Defence Research and Development Canada; pp. 20-28; Contract Report DRDC Ottawa CR 2011-084 Jun. 2011.

Frelinger et al., Flow: Statistics, visualization and informatics for flow cytometry; Source Code for Biology and Medicine; Biomed Central Ltd. Lo. vol. 3, No. 1, pp. 1-12; published Jun. 17, 2008.

Nagel, Henrik R., Erik Granum, and Peter Musaeus, "Methods for visual mining of data in virtual reality," In Proceedings of the International Workshop on Visual Data Mining, pp. 13-27, 2001.

Japanese Office Action dated Sep. 1, 2015, for corresponding Japanese Appln. No. 2011-226675 (5 pages).

Chinese Office Action dated Dec. 3, 2015, for corresponding Chinese Appln. No. 201280049315.4 (18 pages).

Tocchetti, Enrico V., Robert L. Flower, and John V. Lloyd, "Assessment of in vitro-generated platelet micoparticles using a modified flow cytometric strategy;" Thrombosis research 103, No. 1 (2001): 47-55.

Pyne, Saumyadipta, Xinli Hu, Kui Wang, Elizabeth Rossin, Tsung-I. Lin, Lisa M Maier, Clare Baecher-Allan et al., "Automated high-dimensional flow cytometric data analysis," Proceedings of the National Academy of Sciences 106, No. 21 (2009): 8519-8524.

John Altoft, "Data Visualization for ESM and ELINT: Visualizing 3D and Hyper Dimensional Data," Defence Research and Development, Ottawa (Ontariou), Jun. 1, 2011 (102 pages).

David R. Parks et al., "A New "Logicle" Display Method Avoids Deceptive Effects of Logarithmic Scaling for Low Signals and Compensated Data," International Society for Analytical Cytology, Cytometry Part A, 69A:541-551 (2006) (11 pages).

[Fig. 1]

[Fig. 3]
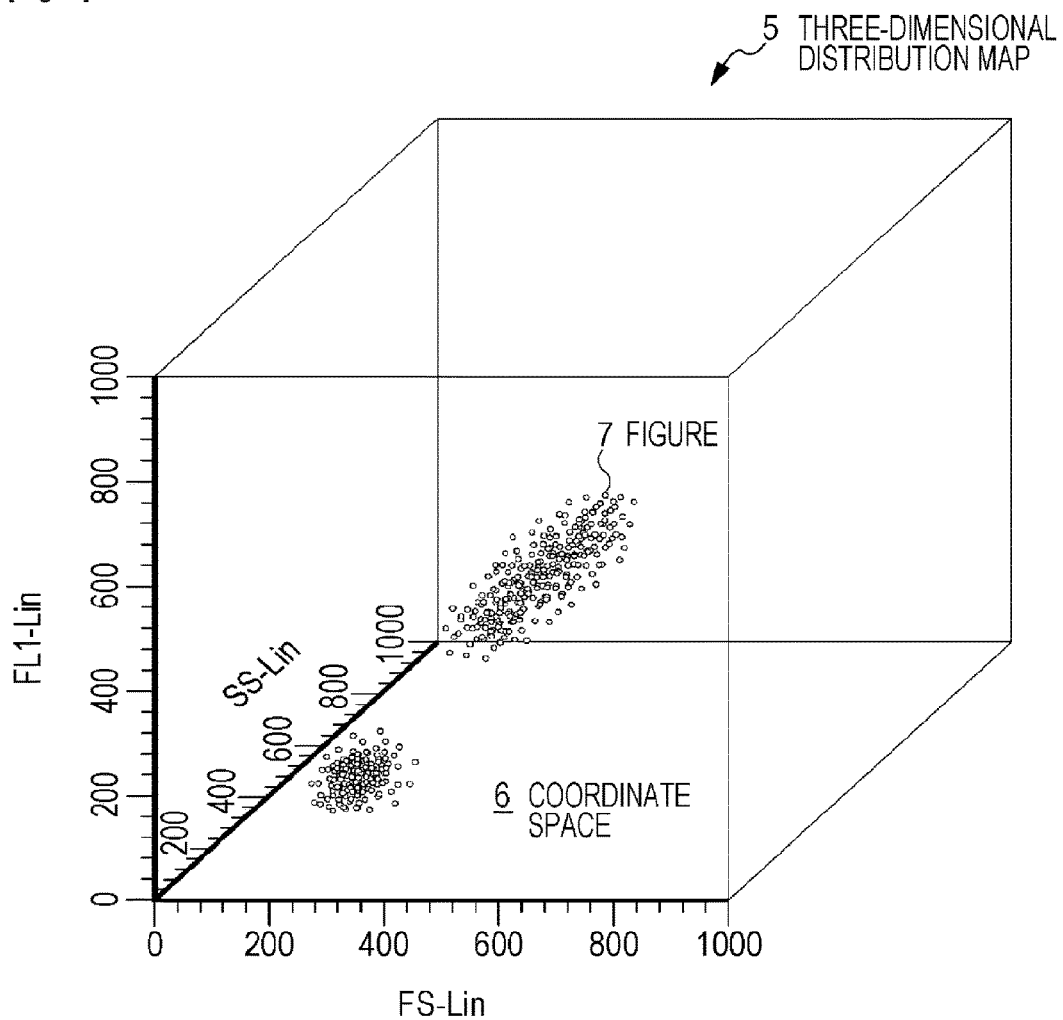

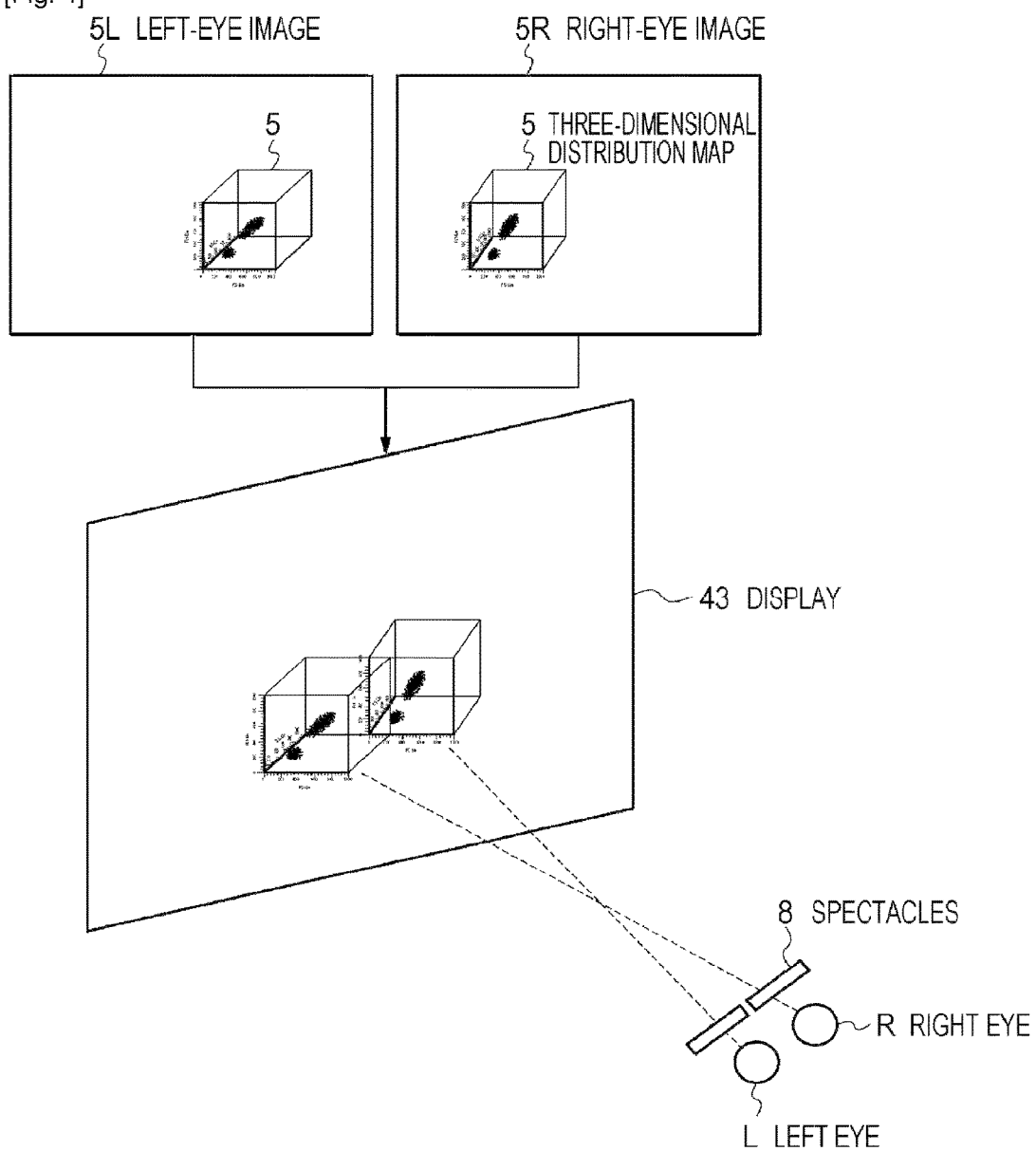

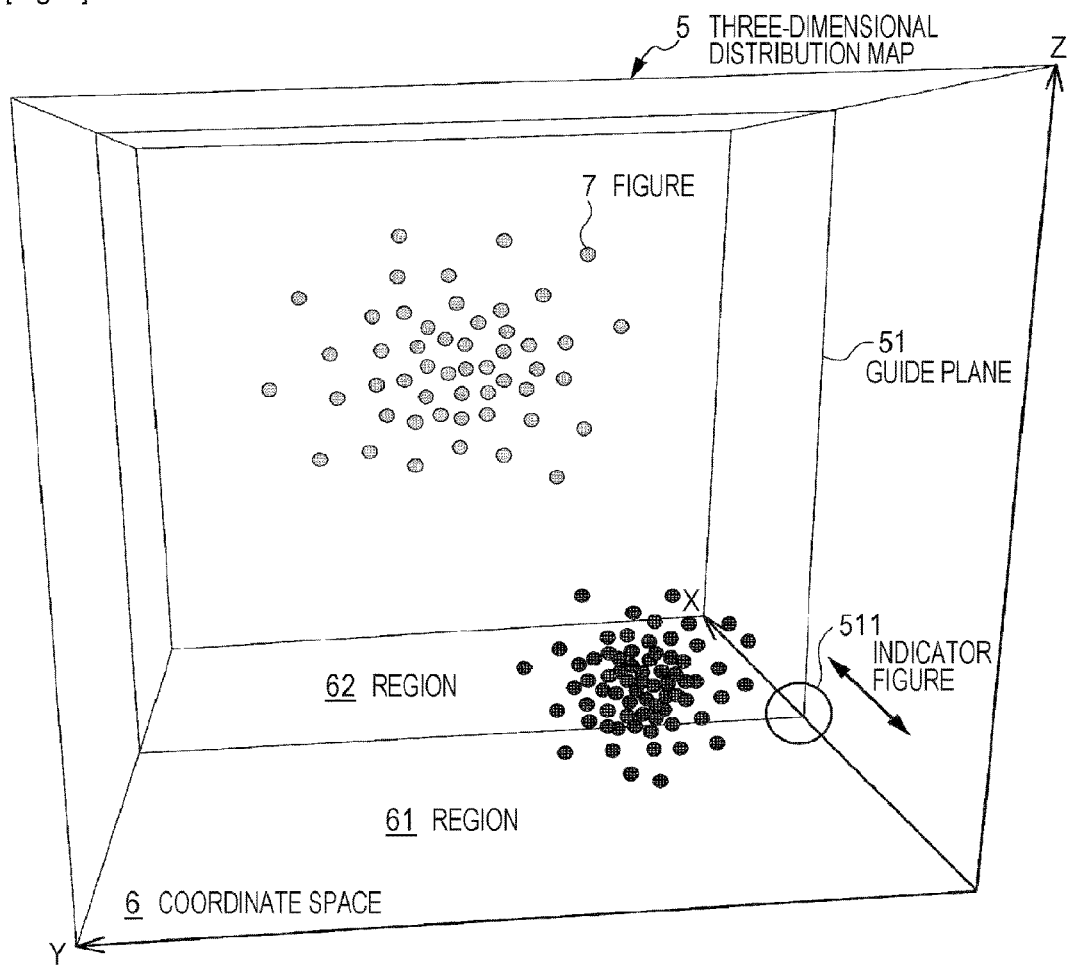
[Fig. 5]

[Fig. 6]
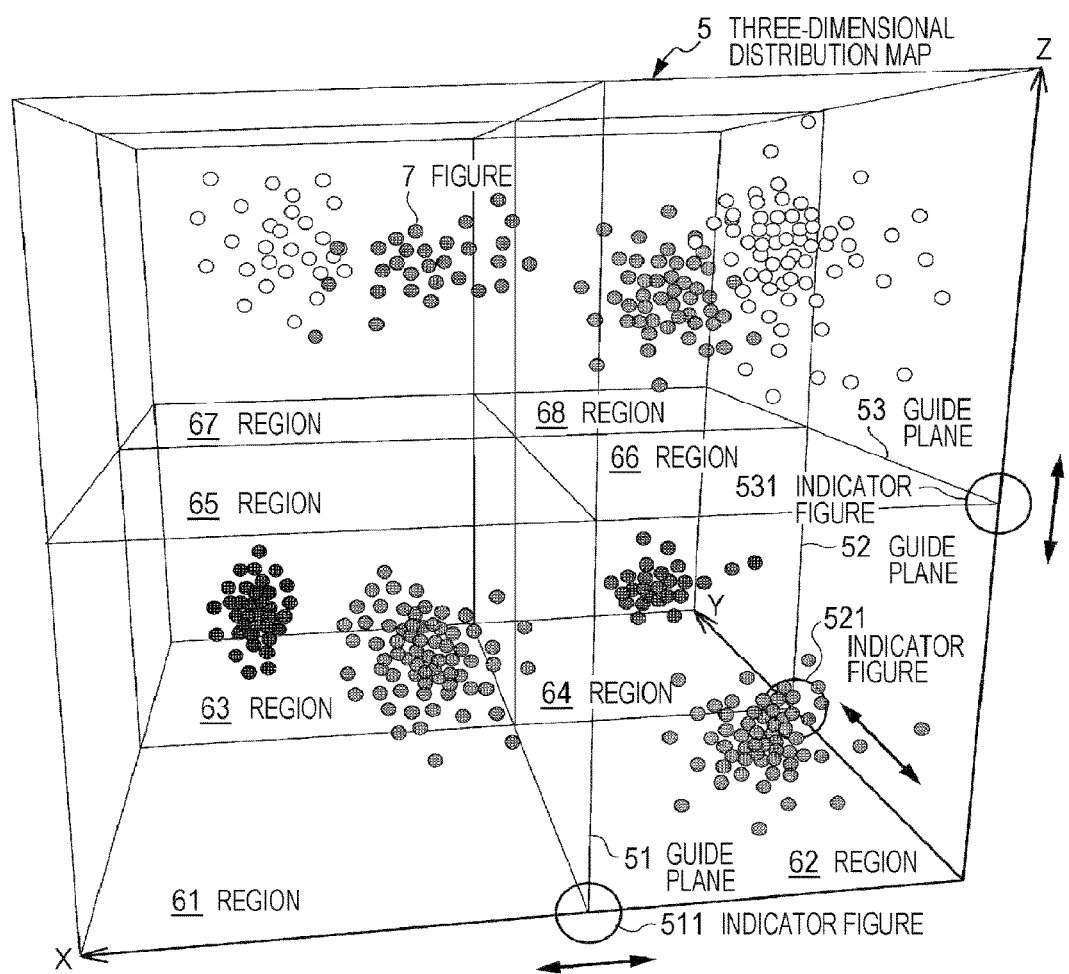

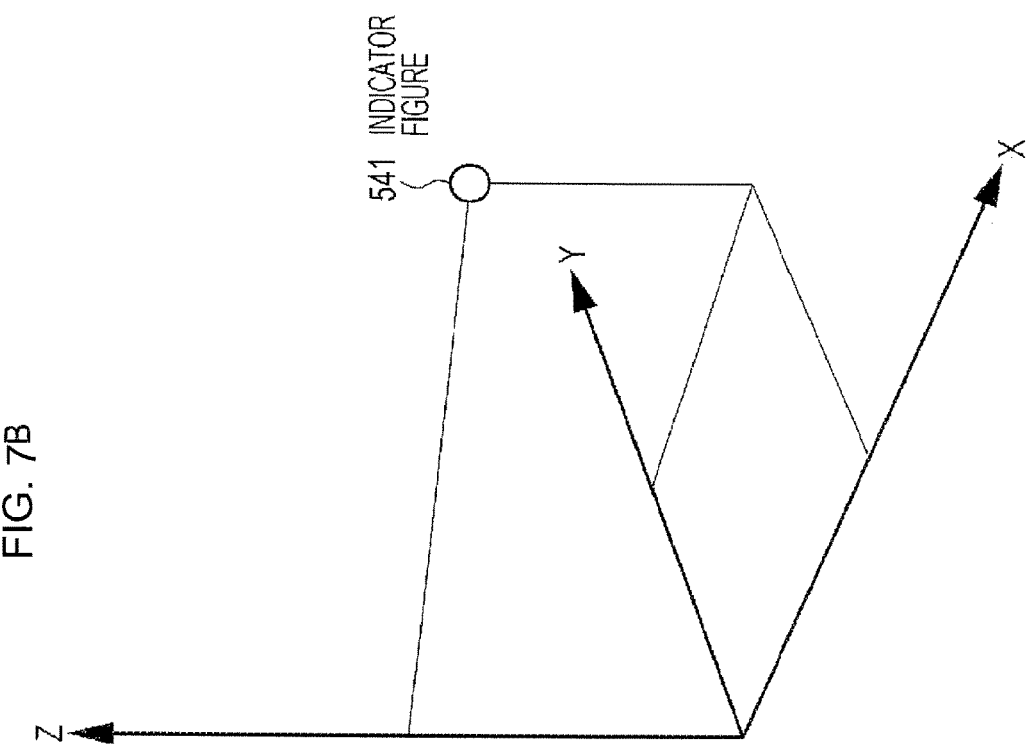
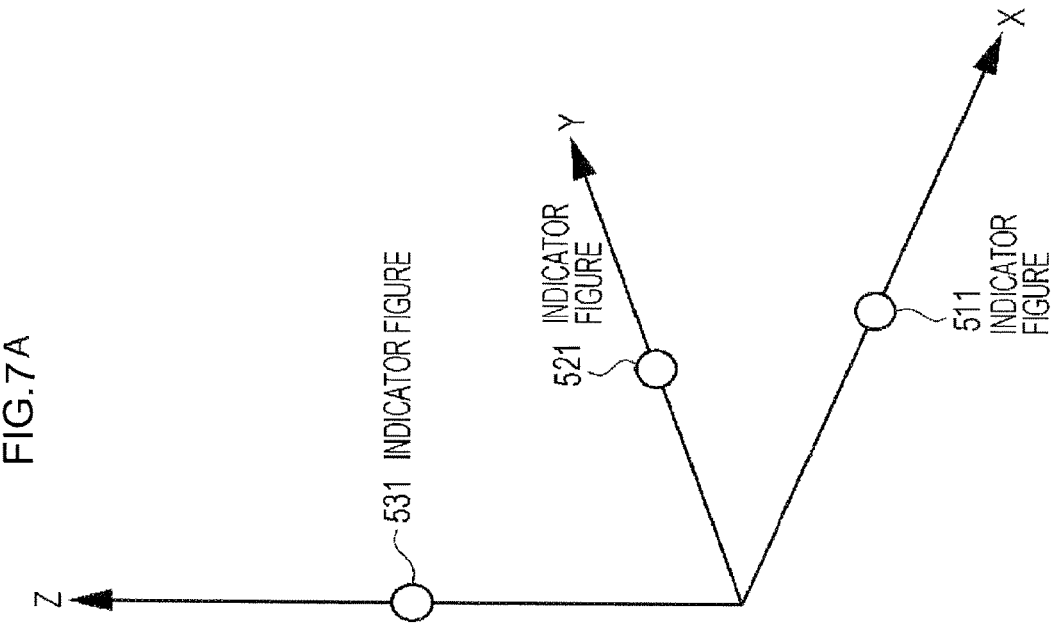

[Fig. 8]
[Fig. 9]
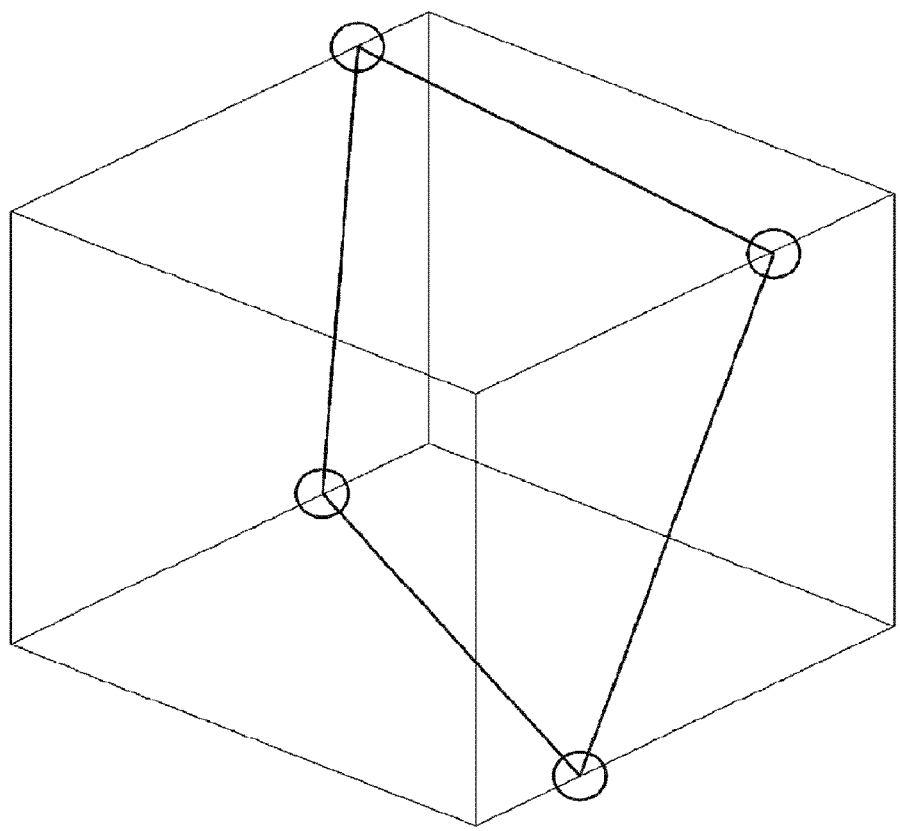
ANALYSIS DATA
| FL1 | FL3 | FL5 | DATA (%) | |
|---|---|---|---|---|
| − | − | − | 1.7% | ▦ |
| − | − | + | 0.6% | ☐ |
| − | + | − | 20.0% | ▦ |
| − | + | + | 7.7% | ▦ |
| + | − | − | 15.6% | ▦ |
| + | − | + | 15.5% | ▦ |
| + | + | − | 38.5% | ■ |
| + | + | + | 0.4% | ☐ |

[Fig. 12]
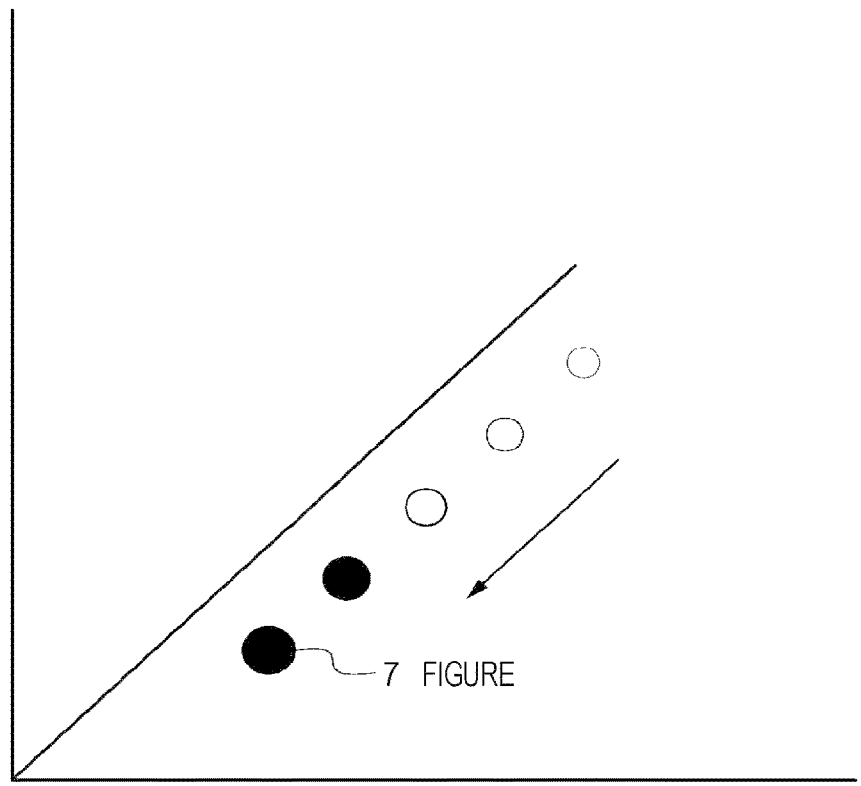

[Fig. 14]
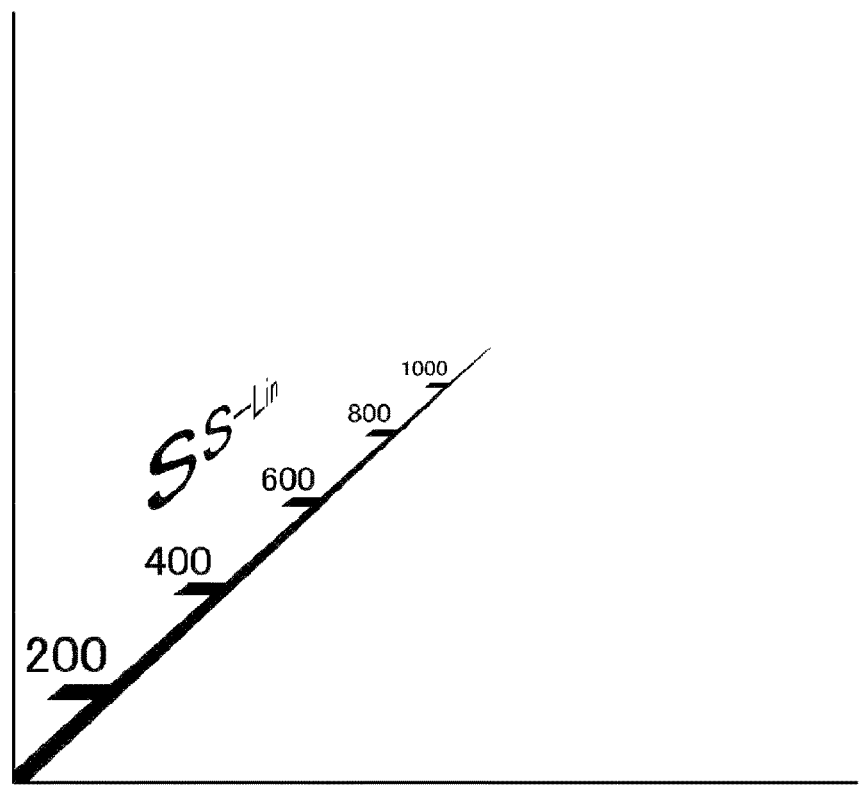

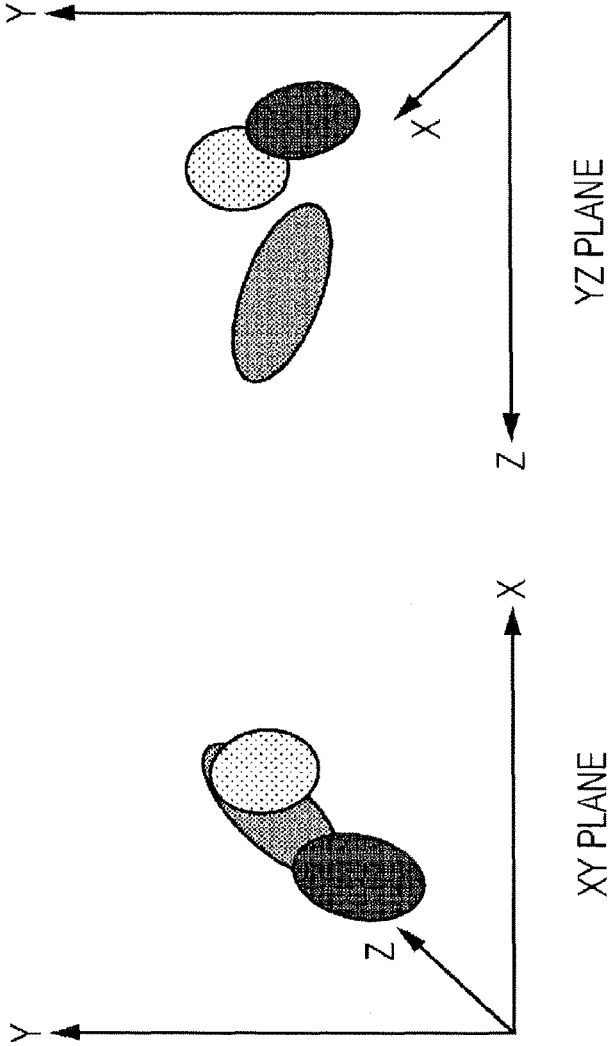
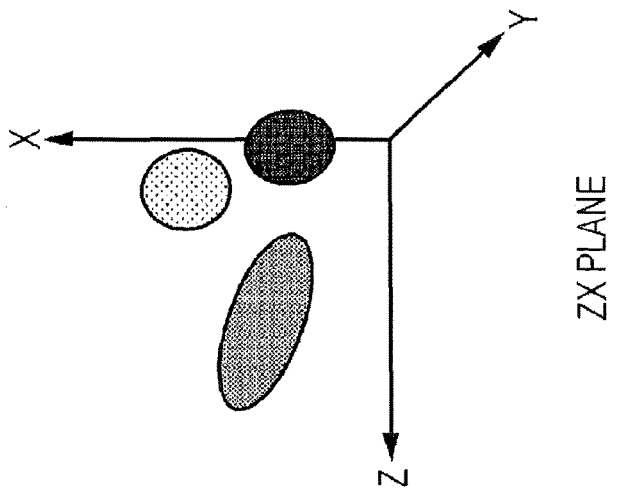

[Fig. 16]
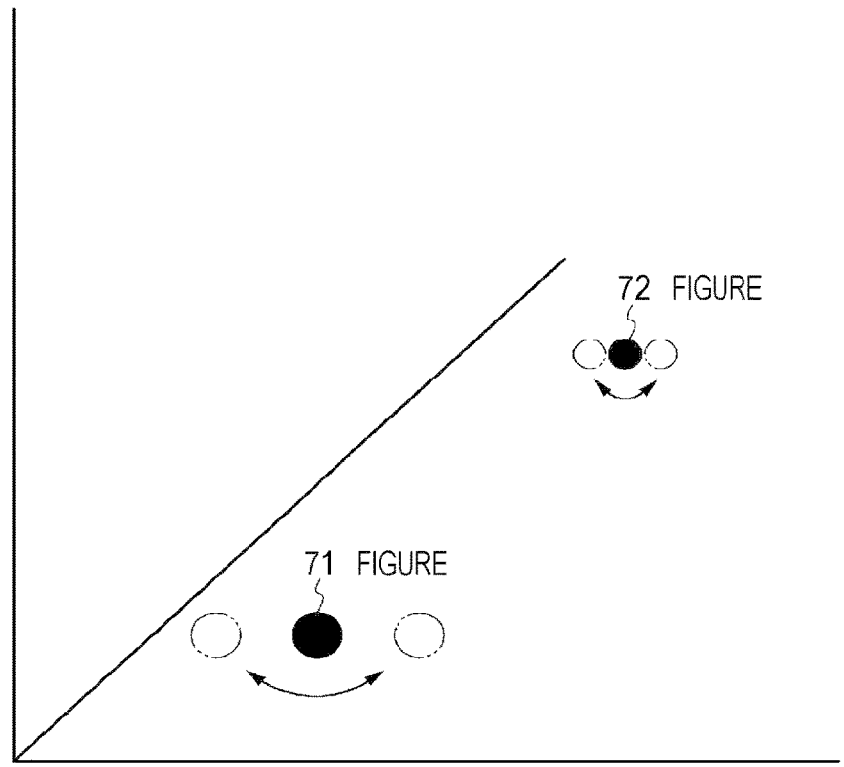

APPARATUS, METHOD AND PROGRAM FOR 3D DATA ANALYSIS, AND MICROPARTICLE ANALYSIS SYSTEM

CROSS REFERENCES TO RELATED APPLICATIONS

The present application is a continuation of U.S. application Ser. No. 14/349,893, filed Apr. 4, 2014, which is a national stage of International Application No. PCT/JP2012/006428 filed on Oct. 5, 2012, which claims priority to Japanese Patent Application No. 2011-226675, filed on Oct. 14, 2011, the entire disclosure of each of which is hereby incorporated by reference herein.

BACKGROUND

The present technique relates to an apparatus, a method and a program for a 3D data analysis, and to a microparticle analysis system. More particularly, the present technique relates to a 3D data analysis apparatus that can display measurement data of microparticles in the form of a 3D stereoscopic image, and that can perform an analysis of data, such as population information, by using the 3D stereoscopic image.

For analyzing microparticles, e.g., biologically-relevant particles such as cells, microorganisms, and liposomes, and synthetic particles such as latex particles, gel particles, and other particles for industrial uses, a microparticle measurement apparatus is employed which optically, electrically or magnetically measures the microparticles by introducing a dispersion liquid of the microparticles into a flow passage.

As one example, there is a particle analyzer for discriminating synthetic particles depending on sizes and shapes thereof. Parameters (variables) measurable by the particle analyzer are, e.g., element compositions and particle diameters of the microparticles.

Further, a flow cytometer (flow cytometry) is used in an analysis of the biologically-relevant particles. Parameters measurable by the flow cytometer are, e.g., forward scattered light (FS), side-way scattering (SS), fluorescence (FL) and impedance of microparticles. The forward scattered light (FS), the side-way scattering (SS), and the fluorescence (FL) are used as parameters indicating optical characteristics of cells and microorganisms (both of which are referred to simply as "cells" hereinafter), and the impedance is used as a parameter indicating electrical characteristics of cells.

More specifically, first, the forward scattered light is light that is scattered forward at a small angle with respect to an axis of laser light. The forward scattered light includes scattered light, diffracted light, and refracted light, which are generated from the laser light at a cell surface. The forward scattered light is primarily used as a parameter indicating the size of the cell. Next, the side-way scattering is light scattered at an angle of about 90 degrees with respect to the axis of the laser light, and such scattered light is generated upon the laser light impinging against a granule, a nucleus, etc. within a cell. The side-way scattering is primarily used as a parameter indicating an internal structure of the cell. Further, the fluorescence is light generated from a fluorescence dye labeled in a cell. The fluorescence is used as a parameter indicating, e.g., the presence or the absence of a cell surface antigen recognized by an antibody that is labeled by the fluorescence dye, and an amount of nucleic acids to which the fluorescence dye is coupled. Moreover, the impedance is measured by the electric resistance method and is used as a parameter indicating the volume of the cell.

For analyzing data measured by the flow cytometer, a data analysis apparatus is employed which creates and displays a chart representing a characteristic distribution of cells within a cell mass by plotting measurement values of the individual cells with any of the measurement parameters set on a coordinate axis. A one-dimensional distribution chart including one measurement parameter is also called a histogram that is created as a graph with the measurement parameter set on an X-axis and a cell number (count) set on a Y-axis. Furthermore, a two-dimensional distribution chart including two measurement parameters is also called a cytogram. The cytogram is created by plotting individual cells, based on measurement values of the cells, in a coordinate plane in which one measurement parameter is set on an X-axis and the other measurement parameter is set on a Y-axis.

By setting regions on the histogram or the cytogram, statistical data can be obtained regarding cells present in each region. A commonly used example of the statistical data is a frequency distribution (population information) representing at what a rate target cells are contained in a cell mass. The frequency distribution is calculated as a rate at which cells present in each region set on the histogram or the cytogram occupy in the entire cell mass.

For example, when it is known that the target cell exhibits a value of not less than a certain value for a predetermined parameter, a process of calculating a distribution frequency of the target cell based on the histogram is started by dividing the histogram into two parts at the certain value on an X-axis. With the division, the histogram is partitioned into a region where the parameter is not less than the certain value (i.e., a region where the target cell exists) and a region where the parameter is less than the certain value (i.e., a region where non-target cells exist). A data analysis apparatus calculates, for each of the set regions, the distribution frequency from the number of the cells present in the relevant region. Also, in the case using the cytogram, a process of calculating a distribution frequency is started by dividing the cytogram into four regions at the certain value on each of an X-axis and a Y-axis. With the division, the cytogram is partitioned into a region where two parameters are both not less than the certain value (i.e., a region where the target cell exists) and a region where at least one of the two parameters is less than the certain value (i.e., a region where non-target cells exist).

PTL 1 proposes "An analysis apparatus comprising measurement data acquisition means for acquiring first, second and third measurement data from an analyte, three-dimensional distribution map creation means for creating a three-dimensional distribution map that represents a distribution of a formed element, which is contained in the analyte, with the first, second and third measurement data set on axes, region setting means for setting a demarcated region on the three-dimensional distribution map in a changeable manner, and reference distribution map creation means for creating, for the formed element belonging to the demarcated region set by the region setting means, at least one of a two-dimensional distribution map with the first and second measurement data set on axes and a frequency distribution map with the first measurement data set on an axis" (see Claim 9 of PTL 1). According to the proposed analysis apparatus, the demarcated region can be set on the three-dimensional distribution map while referring to the two-dimensional distribution map (cytogram) and the frequency distribution map (histogram), which maps are displayed along with the three-dimensional distribution map. Additionally, the three-dimensional distribution map in the proposed analysis apparatus is displayed in a planar view on a display, and it is not displayed in a stereoscopic view.

In relation to the present technique, the binocular stereoscopic solid image technique (3D stereoscopic image technique) will be described below. To produce a binocular stereoscopic solid image, two images are first prepared which are obtained when looking at an object by a right eye and a left eye, respectively. Then, those two images are displayed at the same time such that the image for the right eye is displayed to only the right eye and the image for the left eye is displayed to only the left eye. As a result, an image perceived by eyes of a user when looking at the object in a three-dimensional space is reproduced, thus enabling the user to perceive the object in a stereoscopic view.

3D displays capable of providing a stereoscopic view are mainly practiced as (a) spectacle type, (b) naked eye type, and (c) viewer type. Of those types, (a) spectacle type is further classified into an anaglyph type, a polarization filter type, and a time division type. Also, (b) naked eye type is classified into a parallax barrier type and a lenticular type, and (c) viewer type is classified into a stereoscope type and a head mount type.

CITATION LIST

Patent Literature

PTL 1: Japanese Unexamined Patent Application Publication No. 2006-17497

Non Patent Literature

NPL 1: A New "Logicle" Display Method Avoids Deceptive Effects of Logarithmic Scaling for Low Signals and Compensated Data, Cytometry Part A 69A:541-551, 2006.

SUMMARY

On a histogram with one measurement parameter set on an axis or on a cytogram with one combination of measurement parameters set on axes, there is often a region where a small mass of cells to be analyzed and unwanted cells overlap with each other. For example, when lymphocytes are to be analyzed by using human peripheral blood as a sample, some monocytes and the lymphocytes are often present in the same region on a cytogram in which the forward scattered light (FS) and the side-way scattering (SS) are set on axes.

In the known data analysis using the histogram and the cytogram, therefore, a difficulty resides in specifying a target cell and in setting a region where only the target cell is present. Thus, statistical data, such as a frequency distribution, cannot be obtained at high accuracy.

Accordingly, a primary object of the present technique is to provide a data analysis apparatus that enables a user to easily and intuitively specify microparticles to be analyzed or a small mass of the microparticles on a distribution map, and to obtain accurate statistical data of the microparticles or the small mass of the microparticle.

In an example embodiment of the present disclosure, a data analysis apparatus comprises: a control unit configured to provide data representative of a three dimensional image, the three dimensional image including at least a three dimensional coordinate space which includes at least one plane that divides the three dimensional coordinate space into at least two regions; a display unit configured to produce the three dimensional image based on the data representative of the three dimensional image; and an input unit configured to provide data representative of at least one of a movement and a position of the at least one plane.

In another example embodiment, a data analysis server comprises: a data storage unit configured to store measurement data; and a data processing unit configured to create data representative of a three dimensional image based on the measurement data, the three dimensional image including at least a three dimensional coordinate space which includes at least one plane that divides the three dimensional coordinate space into at least two regions, wherein the at least one plane is moveable based on data representative of at least one of a movement and a position of the at least one plane received from an input device.

In another example embodiment, a data analysis system comprises: a measurement apparatus; and a data analysis apparatus including: a control unit configured to provide data representative of a three dimensional image, the three dimensional image including at least a three dimensional coordinate space which includes at least one plane that divides the three dimensional coordinate space into at least two regions; a display unit configured to produce the three dimensional image based on the data representative of the three dimensional image; and an input unit configured to provide data representative of at least one of a movement and a position of the at least one plane.

In another example embodiment, a data analysis system comprises: a measurement apparatus; and a data analysis apparatus including: a control unit configured to provide data representative of a three dimensional image, the three dimensional image including at least a three dimensional coordinate space which includes at least one plane that divides the three dimensional coordinate space into at least two regions; a display unit configured to produce the three dimensional image based on the data representative of the three dimensional image; and an input unit configured to provide data representative of at least one of a movement and a position of the at least one plane.

In another example embodiment, a computer readable medium stores instructions which, when executed, cause a data analysis apparatus to: provide data representative of a three dimensional image, the three dimensional image including at least a three dimensional coordinate space which includes at least one plane that divides the three dimensional coordinate space into at least two regions; and receive an input providing data representative of at least one of a movement and a position of the at least one plane.

In the present technique, the term "microparticle" may include a variety of microparticles, e.g., biologically-relevant particles such as cells, microorganisms, and liposomes, and synthetic particles such as latex particles, gel particles, and other particles for industrial uses.

The cells may include animal cells (blood cells) and plant cells. The organisms include, e.g., bacteria such as coli bacteria, viruses such as a tobacco mosaic virus, and fungi such as a yeast cell. The biologically-relevant particles include, e.g., chromosomes, liposomes, mitochondria, and organelle (cell organelle), which constitute various cells. The biologically-relevant particles may further include, e.g., nucleic acids, proteins, and biologically-relevant high molecules such as complexes of the formers. The particles for industrial uses may include, e.g., organic or inorganic high-molecular materials, and metals. The organic high-molecular materials include, e.g., polystyrene, styrene divinylbenzen, and polymethyl methacrylate. The inorganic high-molecular materials include, e.g., glass, silica, and magnetic materials. The metals include, e.g., gold colloid and aluminum. Shapes of those microparticles are generally spherical, but the shapes may be aspherical. In addition, the size, the mass, etc. of the microparticle are not limited to particular ones.

According to an example embodiment of the present disclosure, a data analysis apparatus is provided which may enable a user to easily and intuitively specify microparticles to be analyzed or a small mass of the microparticles on a distribution map, and to obtain accurate statistical data of the microparticles or the small mass of the microparticles.

Additional features and advantages are described herein, and will be apparent from the following Detailed Description and the figures.

BRIEF DESCRIPTION OF THE FIGURES

FIG. 3 is an illustration to explain a three-dimensional distribution map displayed by the 3D data analysis apparatus according to the present technique.

FIG. 4 is an illustration to explain a binocular stereoscopic solid image (3D stereoscopic image) displayed by the 3D data analysis apparatus according to the present technique.

FIG. 5 is an illustration to explain a plane (guide plane) and regions, which are set in a coordinate space of the three-dimensional distribution map.

FIG. 6 is an illustration to explain a three-dimensional distribution map in which the coordinate space is partitioned into eight regions.

FIGS. 7A and 7B are illustrations to explain arrangement of indicator figures used for moving the guide plane to partition the coordinate space of the three-dimensional distribution map into the eight regions.

FIG. 8 is an illustration to explain a guide plane that is obliquely set in the coordinate space of the three-dimensional distribution map.

FIG. 9 is a table to explain a display example of analysis results of a frequency distribution in the three-dimensional distribution map in which the coordinate space is partitioned into the eight regions.

FIG. 12 is a conceptual view to explain a stereoscopic observation image of the figure that has been subjected to a shading process.

FIG. 14 is a conceptual view to explain a stereoscopic observation image of a coordinate axis.

FIGS. 15A through 15C are conceptual views to explain a stereoscopic observation image of the three-dimensional distribution map when viewed in a direction of each coordinate axis.

FIG. 16 is a conceptual view to explain a stereoscopic observation image displayed as a moving image in which a figure corresponding to a microparticle swings.

DETAILED DESCRIPTION

Figure 1:
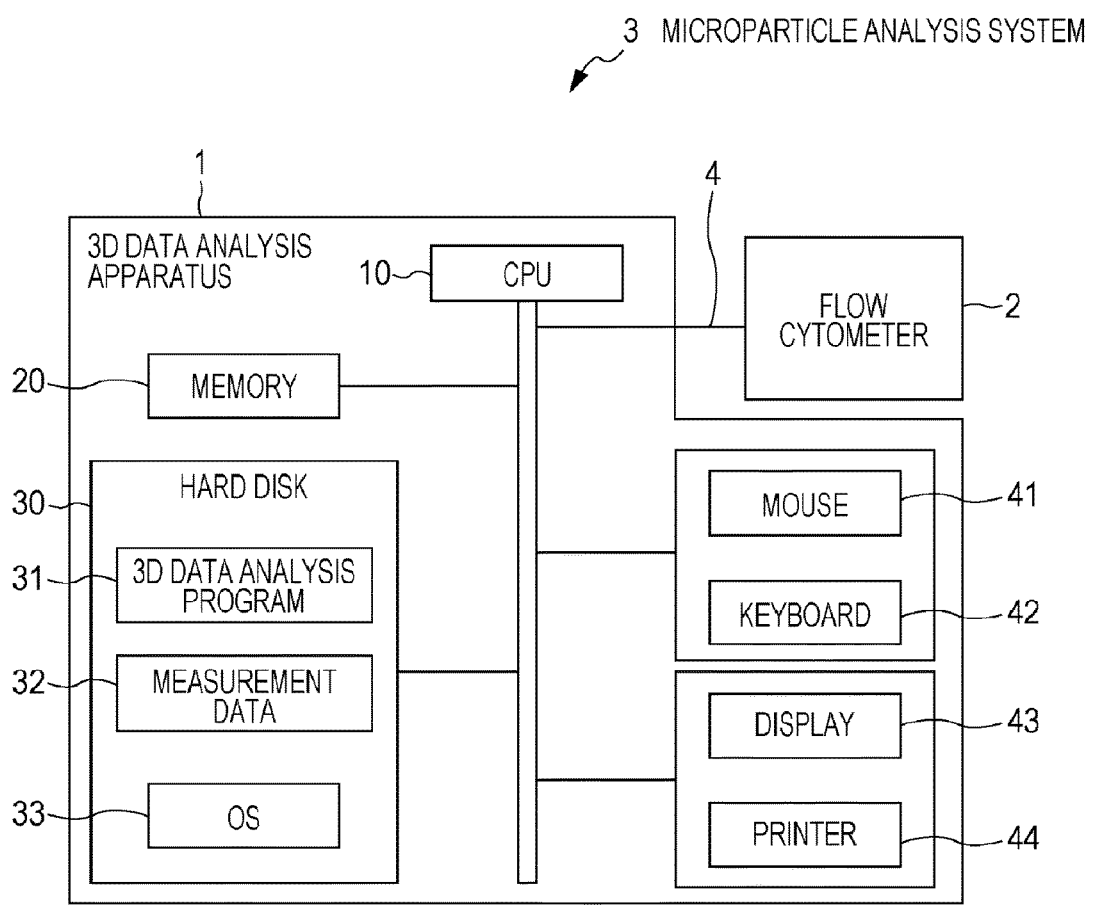
FIG. 1 is a block diagram to explain a configuration of a 3D data analysis apparatus according to the present technique, which is disposed in association with a flow cytometer.
Figure 2:
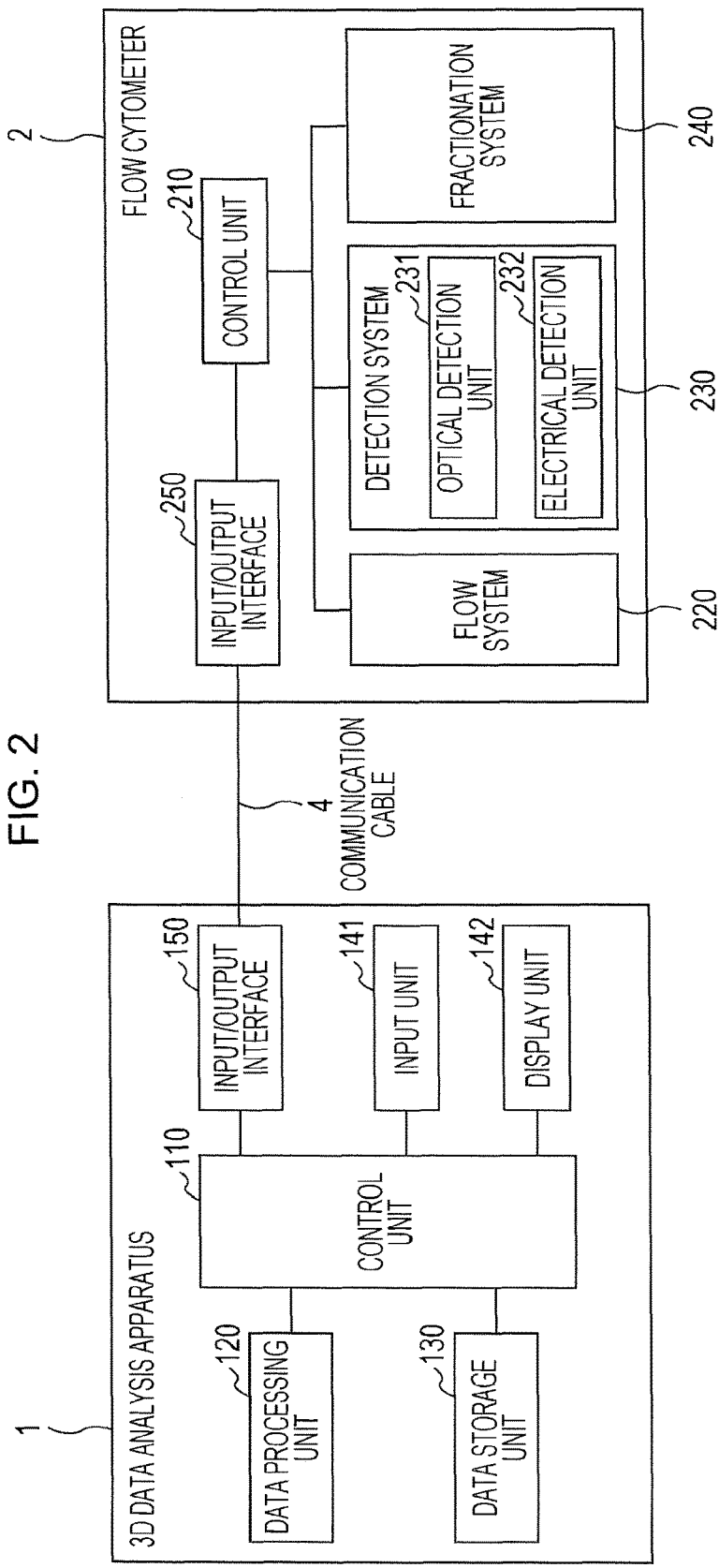
FIG. 2 is a block diagram to explain a functional configuration of the 3D data analysis apparatus according to the present technique.

Embodiments of the present application will be described below in detail with reference to the drawings. It is to be noted that the embodiment described below is one of typical embodiments of the present technique and is not to be construed as limiting the scope of the present technique. The following description is made in order listed below:
1. Configuration of 3D data analysis apparatus
2. Display of 3D stereoscopic image
3. Data analysis
4. Display of data
5. Features of 3D stereoscopic image
    (5-1) Shape of figure
    (5-2) Shading process of figure
    (5-3) Coordinate axis
    (5-4) Moving image
6. 3D data analysis program 1. Configuration of 3D Data Analysis Apparatus FIG. 1 illustrates a hardware configuration of a 3D data analysis apparatus according to the present technique. In the embodiment described here, the 3D data analysis apparatus is disposed in association with a microparticle measurement apparatus, thus constituting a microparticle analysis system. Further, FIG. 2 illustrates a functional configuration of the microparticle analysis system. The following description is made, by way of example, in connection with the case where a flow cytometer is used as the microparticle measurement apparatus.

A 3D data analysis apparatus denoted by symbol 1 in the drawings is connected to a flow cytometer 2 by a communication cable 4, thereby constituting a microparticle analysis system 3. The 3D data analysis apparatus 1 includes a central processing unit (CPU) 10, a memory 20, a hard disk 30, a user interface, etc. The hard disk 30 stores and holds therein a 3D data analysis program 31, microparticle measurement data 32, an operating system (OS) 33, etc. The user interface includes, for example, a mouse 41 and a keyboard 42 for accepting input of information from a user, and a display 43 and a printer 44 for outputting information to the user. Other input devices, such as a stick controller and a pen tablet, may be disposed instead of or in addition to the mouse 41 and the keyboard 42.

A data storage unit 130 (hard disk 30) stores the microparticle (cell) measurement data 32 output from the flow cytometer 2. The measurement data output from an input/output interface 250 of the flow cytometer 2 is input to an input/output interface 150 of the 3D data analysis apparatus 1 via the communication cable 4 and is stored in the data storage unit 130 (hard disk 30).

The measurement data 32 is processed in a data processing unit 120. The data processing unit 120 starts processing upon receiving a user's input from an input unit 141 (e.g., the mouse 41 or the keyboard 42). In more detail, when three independent variables (parameters) are selected from the measurement data 32 and input by the user, the data processing unit 120 creates a three-dimensional distribution map that represents a characteristic distribution of microparticles with the selected parameters set on coordinate axes. The three-dimensional distribution map is created by plotting the microparticles in a coordinate space in which the selected parameters are set on the coordinate axes. The microparticles are plotted by computing, from measurement values of the selected parameters, respective positions and shapes of the microparticles within the coordinate space, and by drawing the computed shapes at the computed positions.

Here, the term "independent parameters" implies different parameters selected from among, for example, forward scattered light (FS), side-way scattering (SS), fluorescence (FL), and impedance of the microparticles. The fluorescence (FL) can be handled as a parameter that is different for each of wavelength ranges of fluorescence dyes labeled on the microparticles. Those fluorescence parameters are expressed as FL1, FL2 to FLn (n is an integer being equal to 3 or more). Examples of the three independent parameters include a combination of the forward scattered light (FS), the side-way scattering (SS), and the fluorescence (FL1), and a combination of the forward scattered light (FS), the side-way scattering (SS), and the impedance. Other combinations of the three independent parameters can also be set by optionally selecting proper parameters from the measurement data.

The three-dimensional distribution map created by the data processing unit 120 is displayed as a 3D stereoscopic image on a display unit 142 (e.g., the display 43). One or plural 3D stereoscopic images can be displayed on the display unit 142. When two or more 3D stereoscopic images are displayed, it is possible to display the 3D stereoscopic images that are observed in plural different directions for the same three-dimensional distribution map, or to display the 3D stereoscopic images of plural three-dimensional distribution maps in which at least one of the selected three parameters differs from one another. Each 3D stereoscopic image is displayed as a binocular stereoscopic solid image described in detail below.

Moreover, when the measurement data 32 includes values measured at plural different times (time points), the display unit 142 may display, as 3D stereoscopic images, three-dimensional distribution maps representing characteristic distributions of the microparticles at the plural time points. The measurement data including values measured at plural different time points is, for example, data obtained by measuring association or dissociation of a molecular complex on the cell surface over time by using the fluorescence resonance energy transfer (FRET) method, data obtained by measuring change of a cell membrane over time by using a fluorescence dye of which fluorescence wavelength is changed corresponding to electric charges of the cell membrane, or data obtained by measuring the expression intensity of a cell surface molecule in correlation to an influx response of intracellular calcium.

The 3D stereoscopic images of the three-dimensional distribution maps at the plural time points may be displayed side by side at a time, or displayed one by one in a switching manner. When the 3D stereoscopic images are displayed in a switching manner, the switching from one to another image may be performed automatically or in accordance with an input signal from the user. By displaying the 3D stereoscopic images of the three-dimensional distribution maps at the plural time points, the user can perform a data analysis while confirming change in the characteristic distribution of the microparticles over time, and can make a more multiple analysis including time (time axis) in addition to the three parameters (coordinate axes).

The 3D stereoscopic image displayed on the display unit 142 may be optionally rotated, enlarged or reduced in accordance with the user's input signal from the input unit 141 (e.g., the mouse 41 or the keyboard 42). Further, when a demarcated region for gating or an analysis region for a later-described data analysis is set in the coordinate space of the three-dimensional distribution map in accordance with the input signal from the input unit 141, the 3D stereoscopic image is rotated, enlarged or reduced together with a stereoscopic shape, which is displayed in the 3D stereoscopic image to represent the demarcated region or the analysis region.

The flow cytometer 2 may have a configuration similar to or appropriately modified from that of the known flow cytometer. More specifically, the flow cytometer 2 includes a control unit 210, a flow system 220, a detection system 230, an input/output interface 250, etc.

In the flow system 220, a sample-liquid laminar flow containing microparticles is introduced into a flow passage, which is formed in a flow cell or a microchip, to flow through a center of a sheath-liquid laminar flow such that the microparticles are arrayed in line within the laminar flow. The detection system 230 acquires parameter values indicating characteristics of the microparticles flowing through the flow passage. In more detail, an optical detection unit 231 emits light to the microparticles flowing through the flow passage, detects scattered light and/or fluorescence generated from the microparticles, and obtains the intensity of the scattered light and/or the fluorescence. The optical detection unit 231 includes, for example, a laser light source, lenses, mirrors, and a filter, as well as an area imaging device, e.g., a CCD or CMOS device, or a PMT (photomultiplier tube). Further, an electrical detection unit 232 includes an electrode disposed to face the microparticles flowing through the flow passage and detects an impedance, a capacity value (capacitance), an inductance, etc. of the microparticle. The flow cytometer 2 may include a fractionation system 240 for fractionating the microparticles on which it has been determined, as a result of the analysis, that the microparticles have the desired characteristic. The fractionation system 240 may be, for example, of the type that a droplet containing the microparticles is ejected to a space outside the flow cell and only the desired microparticles are recovered into a container by controlling a moving direction of the droplet.

Measurement values of the intensity of the scattered light and the fluorescence or measurement values of the impedance, the capacity value (capacitance), the inductance, etc., which have been detected in the detection system 230, are converted to electrical signals and are output, as the measurement data, from the input/output interface 250.

2. Display of 3D Stereoscopic Image

FIG. 3 illustrates a three-dimensional distribution map displayed by the 3D data analysis apparatus according to the present technique. The three-dimensional distribution map illustrated in FIG. 3 is displayed as a 3D stereoscopic image on the display unit 142 to be visually recognized by the user in a stereoscopic view.

A three-dimensional distribution map 5 represents a characteristic distribution of microparticles in a coordinate space 6 in which three parameters selected by the user are set respectively on coordinate axes. In the three-dimensional distribution map 5, a figure 7 corresponding to each microparticle is drawn at a position that is computed from the measurement values of the selected parameters.

FIG. 3 illustrates, for example, the case where the three parameters are set as a combination of the forward scattered light (FS-Lin: X-axis), the side-way scattering (SS-Lin: Y-axis), and the first fluorescence (FL1-Lin: Z-axis). The parameters set on the coordinate axes may be a combination of optionally selected parameters. For example, the first fluorescence (FL1), the second fluorescence (FL2), and the impedance may be set on the X-axis, the Y-axis, and the Z-axis, respectively.

The 3D stereoscopic display of the three-dimensional distribution map 5 is performed by using a binocular stereoscopic solid image. FIG. 4 illustrates a binocular stereoscopic solid image displayed by the 3D data analysis apparatus according to the present technique.

When the parameters are selected by the user, the data processing unit 120 creates the three-dimensional distribution map 5 and then creates an image when looking at the distribution map by a left eye (i.e., a left-eye image 5L) and an image when looking at the distribution map by a right eye (i.e., a right-eye image 5R). The display unit 142 (e.g., the display 43) displays the left-eye image 5L and the right-eye image 5R at the same time such that the left-eye image 5L is presented to the left eye and the right-eye image 5R is presented to the right eye in a separated manner.

In the case of the time division type as one example of the spectacle type, the separate presentation can be performed by alternately displaying the left-eye image 5L and the right-eye image 5R at a slight time difference therebetween, and by synchronizing shutter spectacles 8 with the alternating display of those images. In addition, the separate presentation may be performed by using any of the other spectacle types, such as the anaglyph type and the polarization filter type, the naked eye types, such as the parallax barrier type and the lenticular type, and the viewer types, such as the stereoscope type and the head mount type.

By separately presenting the left-eye image 5L and the right-eye image 5R, the display 43 reproduces an image to be perceived by the eyes of the user when looking at the three-dimensional distribution map in the three-dimensional space, thus enabling the user to see the distribution map in a stereoscopic view.

3. Data Analysis

The analysis region for the data analysis is set by the user who sets a plane, which partitions the coordinate space 6 of the three-dimensional distribution map 5 into plural regions, by employing the input device, e.g., the mouse 41 or the keyboard 42, while looking at the 3D stereoscopic image displayed on the display unit 142. FIG. 5 illustrates concrete examples of the set plane and region. For the sake of simplicity, FIG. 5 illustrates the case where the coordinate space 6 is partitioned along one coordinate axis X into two regions 61 and 62 by a plane (hereinafter referred to also as a "guide plane") 51.

The guide plane 51 is perpendicular to the coordinate axis X and divides the coordinate space 6 into the region 61 and the region 62 in a direction of the coordinate axis X. By moving an indicator figure 511, which is arranged at an intersection of the guide plane 51 and the coordinate axis X, with manipulation of the input device, e.g., the mouse 41 or the keyboard 42, the guide plane 51 is moved together with the indicator figure 511. Stated another way, when the indicator figure 511 is moved on the coordinate axis X in accordance with an input signal from the input unit 141, the guide plane 51 is moved in the coordinate space 6 and its position is changed corresponding to the movement of the indicator figure 511. In FIG. 5, an arrow indicates a moving direction of the indicator figure 511 on the coordinate axis X and a moving direction of the guide plane 51 in the coordinate space 6.

In more detail, for example, when it is known that a target cell exhibits a value of not less than a certain value for a predetermined parameter, the indicator figure 511 on the coordinate axis X representing the predetermined parameter is moved to the certain value. Further, corresponding to the movement of the indicator figure 511, the guide plane 51 is moved in the coordinate space 6, thereby partitioning the coordinate space 6 into a region 62 of not less than the certain value (i.e., a region where the figure 7 corresponding to the target cell exists) and a region 61 of less than the certain value (i.e., a region where the figure 7 corresponding to a non-target cell exists).

In the 3D stereoscopic image, the guide plane 51 is displayed semitransparent such that the user can observe the figure 7, which is observed on the deeper side than the guide plane 51 (i.e., the figure 7 positioned in the region 62 in the illustrate example), when looking at the image in a stereoscopic view. Therefore, the user can visually recognize the figure 7 on the deeper side than the guide plane 51 through the semitransparent guide plane 51. Thus, for example, in trying to discriminate the figure 7 corresponding to the target cell and the figure 7 corresponding to the non-target cell on the basis of an appropriate coordinate position depending on a distribution situation instead of a parameter value, the user can set the position of the guide plane 51 while visually recognizing the distribution of the figures 7 in the direction of the coordinate axis X.

The guide plane 51 may be displayed in the 3D stereoscopic image only when a signal is input from the input unit 141. This enables the user to more clearly visually confirm the figure 7, which is observed on the deeper side than the guide plane 51, when setting the guide plane 51. Moreover, the user can more easily recognize the coordinate axes and scales and numerals on the coordinate axes, which are observed on the deeper side than the guide plane 51. A similar advantageous effect can also be obtained by enabling the guide plane 51 to be selectively displayed or not in the 3D stereoscopic image in accordance with the user's input signal from the input unit 141. In such a case, when adjusting the position of the guide plane 51, the user may display the guide plane 51 in the image. When confirming the position of the set guide plane 51 and regions partitioned by the set guide plane 51, the user may select non-display of the guide plane 51 in the image.

The coordinate space 6 can be partitioned into two or more regions depending on data to be analyzed. While the number of regions is not limited to a particular value, it is preferable to partition the coordinate space 6 into eight regions by setting a guide plane perpendicular to each of the coordinate axes. FIG. 6 illustrates a three-dimensional distribution map in which the coordinate space 6 is partitioned into eight regions.

Three guide planes 51, 52 and 53 are perpendicular to the X-, Y- and Z-coordinate axes, respectively, and the coordinate space 6 is partitioned by those three guide planes into eight regions, i.e., regions 61 to 68. Of the eight regions, for example, the region 61 is a region where a value of a parameter set on the X-axis is larger than a value corresponding to the position of an indicator figure 511, a value of a parameter set on the Y-axis is smaller than a value corresponding to the position of an indicator figure 521, and a value of a parameter set on the Z-axis is smaller than a value corresponding to the position of an indicator figure 531. As another example, the region 68 is a region where a value of the parameter set on the X-axis is smaller than the value corresponding to the position of the indicator figure 511, a value of the parameter set on the Y-axis is larger than the value corresponding to the position of the indicator figure 521, and a value of the parameter set on the Z-axis is larger than the value corresponding to the position of the indicator figure 531.

As described above, the positions of the guide planes 51, 52 and 53 can be changed respectively by moving the indicator figures 511, 521 and 531, which are arranged at intersections of the coordinate axes and the guide planes 51, 52 and 53 (see FIG. 7(A)). Alternatively, an indicator figure 541 may be arranged, as an indicator figure for moving the guide planes 51, 52 and 53, at an intersection of the three planes. In such a case, the positions of the guide planes 51, 52 and 53 can be simultaneously changed together by moving the indicator figure 541.

While the above description has been made in connection with the case where the guide plane is set as a plane perpendicular to the coordinate axis, the guide plane may be set as a plane that is oblique to all the coordinate axes instead of being perpendicular thereto (see FIG. 8). Also in such a case, a position and an inclination of the guide plane can be changed by moving indicator figures arranged respectively at intersections of the guide plane and the coordinate axes.

4. Display of Data

The data processing unit 120 calculates parameter values and/or a distribution frequency in each region, and displays information (analysis results) regarding the parameter values and/or the distribution frequency on the display unit 142.

The information regarding each of the parameter values may be, e.g., a minimum value, a maximum value, a mean value, a median value, a standard deviation, and a standard error for the figures 7 present in the relevant region. Also, the information regarding the distribution frequency is a proportion at which the number of the figures 7 present in the relevant region occupies in the number of the figures 7 present in the entire coordinate space 6. The distribution frequency is useful, for example, as population information representing at what a rate target cells are contained in a cell mass.

FIG. 9 illustrates a display example of analysis results of the frequency distribution in the three-dimensional distribution map in which the coordinate space 6 is partitioned into the eight regions. The following description is made in connection with the case where, in the three-dimensional distribution map 5 including the regions 61 to 68 set as illustrated in FIG. 6, the first fluorescence (FL1), the third fluorescence (FL3), and the fifth fluorescence (FL5) are set respectively as parameters on the X-axis, Y-axis, and Z-axis.

In a table of the analysis results illustrated in FIG. 9, for example, a field including FL1(+), FL3(−), and FL5(−) represents the analysis result (15.6%) of the frequency distribution in the region 61 where a measurement value of FL1 is larger than the value corresponding to the position of the indicator figure 511, a measurement value of FL3 is smaller than the value corresponding to the position of the indicator figure 521, and a measurement value of FL5 is smaller than the value corresponding to the position of the indicator figure 531. As another example, a field including FL1(−), FL3(+), and FL5(+) represents the analysis result (7.7%) of the frequency distribution in the region 68 where a measurement value of FL1 is smaller than the value corresponding to the position of the indicator figure 511, a measurement value of FL3 is larger than the value corresponding to the position of the indicator figure 521, and a measurement value of FL5 is larger than the value corresponding to the position of the indicator figure 531.

The analysis results of the frequency distribution may be presented to the user in the 3D stereoscopic image, which is displayed on the display unit 142, by displaying the figures 7 in different regions in multiple colors each of which is correlated to a predetermined range of the distribution frequency. The distribution frequency and the color of the figure 7 can be correlated with each other by employing the heat map expression that has hitherto been used to visualize frequency information.

Figure 10:
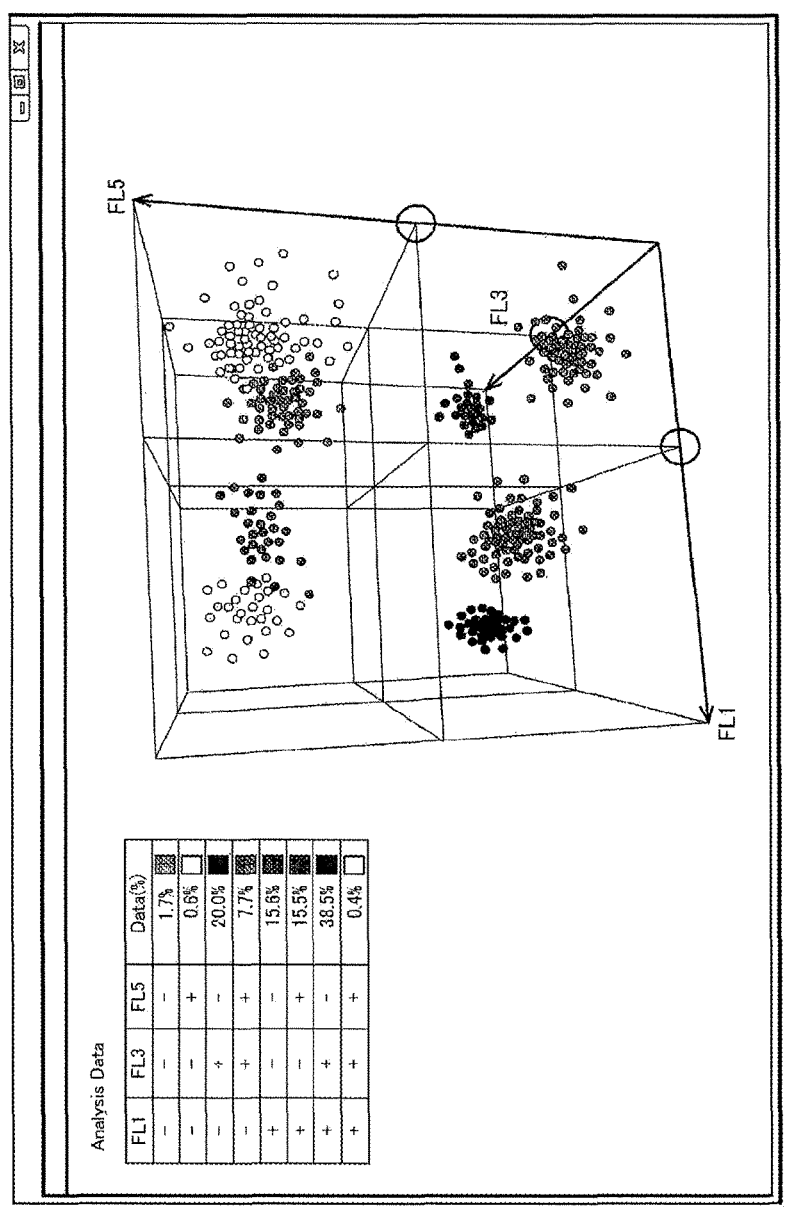
FIGS. 10A and 10B are illustrations to explain a three-dimensional distribution map that is displayed in multiple colors by reflecting the distribution frequency.
Figure 10:
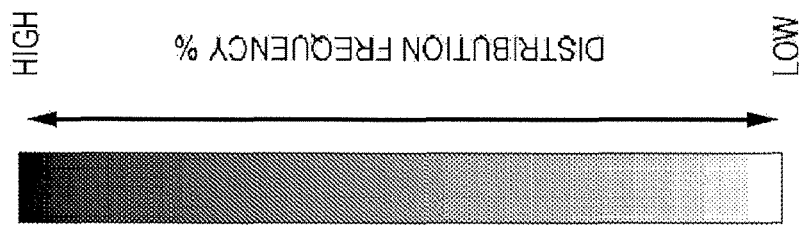

FIG. 10 illustrates a three-dimensional distribution map that is displayed in multiple colors by reflecting the distribution frequency. The three-dimensional distribution map illustrated in FIG. 10(A) is the same as that illustrated in FIG. 6. It is thus assumed that the coordinate space 6 is partitioned into the regions 61 to 68 by the guide planes 51, 52 and 53, and that the distribution frequency in each region is calculated as per illustrated in FIG. 9. FIG. 10(B) indicates a color that is assigned, depending on a numerical value of the distribution frequency calculated for each region, to the figures 7 present in the relevant region. A darker color is assigned to a region where the distribution frequency is higher, and a lighter color is assigned to a region where the distribution frequency is lower.

In the three-dimensional distribution map illustrated in FIG. 10(A), based on the correlation between the distribution frequency and the color illustrated in FIG. 10(B), the figures 7 are displayed in a darker color in the region where the distribution frequency is higher (the distribution frequency is highest in the region 63 of FIG. 6), and the figures 7 are displayed in a lighter color in the region where the distribution frequency is lower (the distribution frequency is lowest in the region 67 of FIG. 6). Thus, the user can intuitively perceive the analysis results of the frequency distribution by displaying, in the 3D stereoscopic image, the figures 7 in the individual regions in different colors depending on the analysis results of the frequency distribution.

The distribution frequency and the color can be correlated with each other by multicolor display using not only shades of a single color as described above, but also different luminosities, saturations, or hues. For example, as with the known heat map expression, the distribution frequency may be displayed in different colors, which are changed from a warm color to a cold color as the distribution frequency lowers, by assigning the warm color, e.g., red, to a region where the distribution frequency is high, by assigning a neutral color, e.g., green, to a region where the distribution frequency is medium, and by assigning the cold color, e.g., blue, to a region where the distribution frequency is low.

The calculation of the parameter values and/or the distribution frequency in each region by the data processing unit 120 may be newly executed in interlock with user's manipulation of the input device to move the guide plane whenever the position of the guide plane is changed and the setting of the regions is made again. Furthermore, the newly calculated distribution frequency is preferably reflected on the 3D stereoscopic image, which is displayed on the display unit 142, by updating the color of the figure 7 in each region of the three-dimensional distribution map to the color corresponding to the calculated distribution frequency whenever the calculation is executed. Thus, by displaying the analysis results of the distribution frequency in the 3D stereoscopic image in real time responsive to the user's operation of changing the position of the guide plane and setting the regions again, the user can more intuitively perceive the analysis results, and this contributes to improving data analysis efficiency.

Other than the above-described method of automatically changing the color of the figure 7 in each region of the three-dimensional distribution map in interlock with the user's operation of changing the position of the guide plane and setting the regions again, the user may change the color of the figure 7 at desired timing, for example, after changing the position of the guide plane, to be able to confirm the analysis results of the distribution frequency. In such a case, during the user's operation of changing the position of the guide plane and setting the regions again, all the figures 7 in all the regions may be displayed in the same color, but the figures 7 in each of the regions are preferably displayed in a specific color per region. For example, in the three-dimensional distribution map where the coordinate space 6 is partitioned into eight regions as illustrated in FIG. 6, the figures 7 in the eight regions, i.e., the regions 61 to 68, are displayed in different specific colors. Thus, by displaying the figures 7 in the specific color for each of the regions, the user can set the regions while confirming in which one of the regions the figure 7 is present, when changing the position of the guide plane, and can perform the accurate setting of the regions while clearly recognizing the boundary between the regions. After the completion of, e.g., the change in the position of the guide plane, preferably, the user changes the color of the figure 7 from the color specific to the relevant region to the color reflecting the distribution frequency in the relevant region at desired timing so that the user can confirm the analysis results of the distribution frequency.

In the 3D data analysis apparatus 1, as described above, the user can set the regions for the data analysis while looking at, in a stereoscopic view, the three-dimensional distribution map in which three optionally selected parameters are set on the coordinate axes, and can obtain the analysis results of the variable values and/or the distribution frequency in the set regions. With the 3D data analysis apparatus 1, therefore, even for a sample containing microparticles to be analyzed, which are difficult to specify by using the known histogram or cytogram with one or two parameters set on one or two coordinate axes, it is possible to set a region where only the microparticles to be analyzed are present, and to obtain accurate analysis results. Further, information regarding three characteristics of the microparticle can be obtained with one graph by displaying the three-dimensional distribution map in an optional combination of the parameters set on the coordinate axes. In addition, more information can be obtained by displaying 3D stereoscopic images of the same three-dimensional distribution map, which are observed from plural different directions, or 3D stereoscopic images of plural three-dimensional distribution maps in which at least one of three selected parameters is different from one another. Accordingly, the 3D data analysis apparatus 1 can reduce the number of graphs to be referred to in comparison with that in the known analysis using the histogram or the cytogram, and can perform an efficient analysis.

5. Features of 3D Stereoscopic Image

Features of the 3D stereoscopic image displayed by the 3D data analysis apparatus according to the present technique will be described below in successive order.

(5-1) Shape of Figure

The figure corresponding to the microparticle, denoted by symbol 7 in FIG. 3, is computed as a polyhedron made of a combination of polygons having predetermined shapes and is displayed in the 3D stereoscopic image. As described above, the data processing unit 120 computes the position of each microparticle in the coordinate space and the figure 7 thereof on the basis of the measurement values of the parameters selected by the user, and creates a three-dimensional distribution map. At that time, a computation load of the data processing unit 120 can be reduced by computing the figure 7 on condition that the figure 7 is a polyhedron made of a combination of polygons having predetermined shapes. Moreover, a stereoscopic effect in appearance of the image can be improved in a stereoscopic view by displaying, in the 3D stereoscopic image, the figure as a polyhedron made of a combination of polygons having predetermined shapes.

Figure 11:
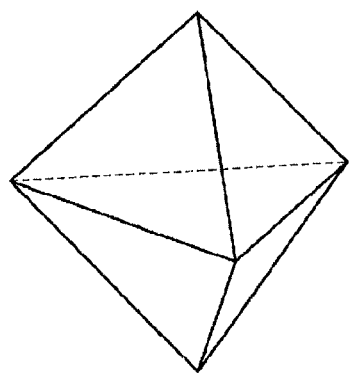
FIGS. 11A and 11B are illustrations to explain shapes of a figure corresponding to the microparticle in the 3D stereoscopic image.
Figure 11B:
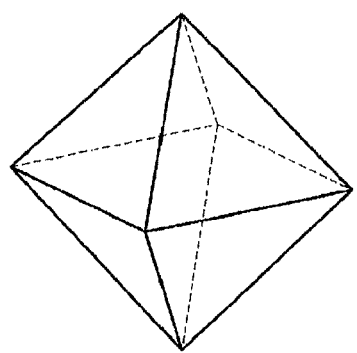

The polyhedron made of a combination of polygons having predetermined shapes may be, e.g., a hexahedron made of a combination of six triangular polygons as illustrated in FIG. 11(A), or an octahedron made of a combination of eight triangular polygons as illustrated in FIG. 11(B). The shape of the figure 7 is not limited to particular one insofar as the figure shape is a polyhedron made of a combination of polygons having predetermined shapes. However, the figure shape is preferably a hexahedron or an octahedron from the viewpoint of reducing the computation load and improving the stereoscopic effect in appearance.

(5-2) Shading Process of Figure

In the 3D stereoscopic image, the figure 7 is displayed darker as the figure is observed on the side closer to the user in a stereoscopic view, and is displayed lighter as the figure is observed on the side farther away from the user. A process of changing a shade of the figure 7 in such a manner is referred to as a "shading process" hereinafter.

FIG. 12 is a conceptual view of a stereoscopic observation image (hereinafter referred to simply as a "stereoscopic image") of the figure 7 that has been subjected to the shading process. Along a direction denoted by an arrow in FIG. 12, the figure 7 observed on the side closer to the user is displayed darker, and the figure 7 observed on the side farther away from the user is displayed lighter. By executing the shading process of the figure 7 in such a manner, individual stereoscopic items in the 3D stereoscopic image can be displayed with a depth feeling, and the stereoscopic effect in their appearances can be improved.

A processing method executed in the shading process will be described with reference to FIG. 13. A left-eye image and a right-eye image are simultaneously displayed on the display 43. In a stereoscopic view, the left-eye image and the right-eye image of a figure 70, which is observed at the position of a screen of the display 43, are displayed in a superimposed state (see FIG. 13(B)).

Figure 13A:
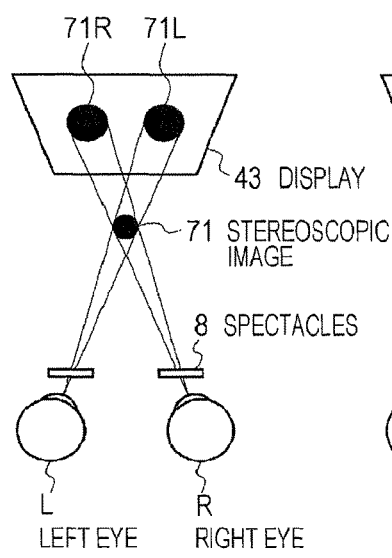
FIGS. 13A through 13C are illustrations to explain a method for executing the shading process.
Figure 13B:
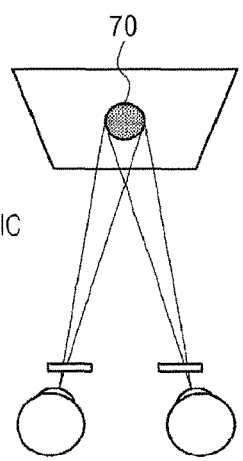
Figure 13C:
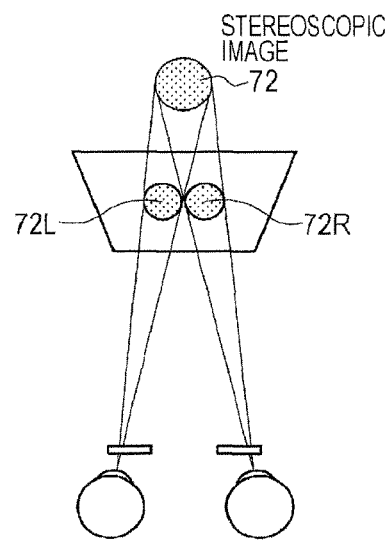

When the left-eye image and the right-eye image are displayed on the display 43 such that the left-eye image is positioned on the right side of the right-eye image (see FIG. 13(A)), the figure is observed on the side closer to the user than the position of the screen of the display 43 in a stereoscopic view. In FIG. 13(A), a stereoscopic image of the figure observed in a state popping out forward of the screen position is denoted by symbol 71, and the left-eye image and the right-eye image of the figure 71, which are displayed on the display 43, are denoted by a symbol 71L and a symbol 71R, respectively. On the other hand, when the left-eye image and the right-eye image are displayed on the display 43 such that the left-eye image is positioned on the left side of the right-eye image (see FIG. 13(C)), the figure is observed on the side farther away from the user than the position of the screen of the display 43 in a stereoscopic view. In FIG. 13(C), a stereoscopic image of the figure observed in a state popping out rearward of the screen position is denoted by symbol 72, and the left-eye image and the right-eye image of the figure 71, which are displayed on the display 43, are denoted by a symbol 72L and a symbol 72R, respectively.

In the shading process, the left-eye image 71L and the right-eye image 71R of the figure 71, which is observed on the side closer to the user, is displayed darker, and the left-eye image 72L and the right-eye image 72R of the figure 72, which is observed on the side farther away from the user, is displayed lighter.

(5-3) Coordinate Axis

In the 3D stereoscopic image, the coordinate axis is displayed thicker in its portion that is observed on the side closer to the user in a stereoscopic view, and is displayed thinner in its portion that is observed on the side farther away from the user. FIG. 14 is a conceptual view of a stereoscopic image of the coordinate axis displayed in a gradually changing thickness. By changing the thickness of the coordinate axis in such a way, individual stereoscopic items in the 3D stereoscopic image can be displayed with a depth feeling, and the stereoscopic effect in their appearances can be improved.

Moreover, as illustrated in FIG. 14, the depth feeling on the stereoscopic image can be further increased by displaying a scale interval set on the coordinate axis to be wider in a portion that is observed on the side closer to the user in a stereoscopic view, and to be narrower in a portion that is observed on the side farther away from the user. A similar effect can also be obtained by displaying the name (SS-Lin in FIG. 14) of the coordinate axis and characters denoting scale numerals (200, 400, 600, 800 and 1000 in FIG. 14) to be larger on the side closer to the user and to be smaller on the side farther away from the user. It is to be noted that a process of changing the thickness of the coordinate axis, the scale interval, and the character size can be performed by employing the above-described shading process.

The coordinate axis may be a biexponential axis (see NPL 1) having such a characteristic that a linear axis (axis representing linearity) and a logarithmic axis are combined with each other. In the case of the biexponential axis, for data that a measurement value of the parameter selected to be set on the coordinate axis is smaller than a predetermined value, the position of the figure 7 corresponding to the microparticle is computed by employing a function that includes a linear function as a main function element. Further, for data that the measurement data is larger than the predetermined value, the position of the figure 7 is computed by employing a function that includes a logarithmic function as a main function element. For more simplicity, the biexponential axis may include a logarithmic axis assigned to a region of larger than a predetermined value, and a linear axis assigned to a region of smaller than the predetermined value. By setting the biexponential axis as the coordinate axis of the three-dimensional distribution map, it is possible not only to display a wider dynamic range by utilizing a characteristic of the logarithmic axis, but also to simultaneously display a negative number by utilizing a characteristic of the linear axis. Additionally, at least one of the coordinate axes of the three-dimensional distribution map may be the biexponential axis.

(5-4) Moving Image

As described above, the three-dimensional distribution map displayed on the display unit 142 (e.g., the display 43) may be optionally rotated, enlarged, or reduced in accordance with the user's input signal from the input unit 141 (e.g., the mouse 41 or the keyboard 42). When the 3D stereoscopic image is rotated, the coordinate axes are preferably displayed, as illustrated in FIG. 3, in alignment with respective sides of a solid shape (cubic in FIG. 3) that constitutes the coordinate space 6. Since the solid shape of the coordinate space 6 is more specifically displayed by setting the coordinate axes in such a manner, the user can more easily recognize change in orientation of the three-dimensional distribution map when the 3D stereoscopic image is rotated.

The 3D stereoscopic image displayed on the display 43 may be optionally rotated in accordance with an input from the user, or may be constantly slowly rotated in a specific direction or an unspecific direction. By displaying the 3D stereoscopic image as a moving image constantly rotated, the stereoscopic effect in appearance can be increased in comparison with the case displaying a still image.

Moreover, the 3D stereoscopic image displayed on the display 43 can be automatically turned in accordance with a user's input signal to an orientation, which provides a stereoscopic observation image as viewed from the direction of the coordinate axis selected by the user, at any timing during rotation in accordance with user's manipulation or during automatic rotation. FIG. 15 illustrates a stereoscopic observation image of the three-dimensional distribution map when viewed in a direction of each coordinate axis. FIG. 15(A) illustrates an observation image when viewed in the direction of the Z-axis, FIG. 15(B) illustrates an observation image when viewed in the direction of the X-axis, and FIG. 15(C) illustrates an observation image when viewed in the direction of the Y-axis. Switching of a viewing point from the direction of one coordinate axis to the direction of another coordinate axis may be performed, for example, such that the viewing point of the image is turned to the direction of the Z-axis upon input of a Z-key from the keyboard 42 and is turned to the direction of the X-axis from the direction of the Z-axis upon input of an X-key. Alternatively, the switching of the viewing point from the direction of one coordinate axis to the direction of another coordinate axis may be performed, for example, by clicking an icon displayed on the display 43 with the mouse 41. By thus enabling the 3D stereoscopic image to be observed while the viewing point is switched from the direction of one coordinate axis to the direction of another coordinate axis with a simple input operation, the user can more easily understand the characteristic distribution of microparticles in the three-dimensional distribution map.

Furthermore, when the 3D stereoscopic image is displayed on the display 43 in a constantly rotated state, the 3D stereoscopic image is preferably rotated such that an up-and-down direction of the three-dimensional distribution map is fixedly held. In other words, the 3D stereoscopic image is preferably rotated in a state where any one selected from among an XY-plane, a YZ-plane and a ZX-plane of the three-dimensional distribution map is always oriented downwards of the distribution map. More specifically, for example, when the 3D stereoscopic image illustrated in FIG. 15(A) is constantly rotated, the image is rotated such that the ZX-plane is always positioned at the bottom of the three-dimensional distribution map. On that occasion, the image may be rotated while a rotation axis of the three-dimensional distribution map is inclined or an inclination angle thereof is changed. By applying a certain restriction to the rotating direction of the 3D stereoscopic image in such a manner, the user can more easily perceive the direction of the user's viewing point for the three-dimensional distribution map, and can be avoided from failing to recognize the orientation of the three-dimensional distribution map.

The 3D stereoscopic image displayed on the display 43 may be displayed as a moving image in which a figure corresponding to a microparticle swings. In that case, a figure observed on the side closer to the user in a stereoscopic view is displayed to swing over a stroke larger than that for the figure 7 observed on the side farther away from to the user. FIG. 16 is a conceptual view of a stereoscopic image of a figure that is given with a swinging motion. Figures 71 and 72 are displayed such that each figure swings in a right-and-left direction as indicated by an arrow, and that a swing width in the right-and-left direction is set to be larger for the figure 71 observed on the side closer to the user and to be smaller for the figure 72 observed on the side farther away from the user. By displaying the figure 7 observed on the side closer to the user to swing to a larger extent than the figure observed on the side farther away from the user as described above, individual stereoscopic items in the 3D stereoscopic image can be displayed with a depth feeling, and the stereoscopic effect in their appearances can be improved.

Moreover, when the 3D stereoscopic image is displayed as a moving image, the figure corresponding to the microparticle may be blinked. In that case, the stereoscopic effect in appearance of the 3D stereoscopic image can be further improved by blinking the figure 7 observed on the side closer to the user in a stereoscopic view at a higher frequency than the figure observed on the side farther away from the user.

In addition, when the measurement data 32 includes measurement values at plural time points, respective 3D stereoscopic images of the three-dimensional distribution map at the plural time points can be displayed as a series of moving images. As a result, for example, in the above-described case of measuring association or dissociation of a molecular complex on the cell surface, change of the association, etc. of the molecular complex on the cell surface over time can be confirmed with the series of moving images.

As described above, the 3D data analysis apparatus according to the present technique is designed with contrivances to improve the stereoscopic effect in appearance of the displayed 3D stereoscopic image. Accordingly, even with the three-dimensional distribution map consisted of only points (figures corresponding to microparticles) and lines (coordinate axes), the user can analyze the measurement data while visually confirming the stereoscopic image with good visibility, and can easily and intuitively specify microparticles to be analyzed and a small mass of the microparticle on the distribution map.

6. 3D Data Analysis Program

A 3D data analysis program according to the present technique causes a computer to execute a step of computing positions and shapes in a coordinate space in which three independent variables selected from measurement data of the microparticles are set on coordinate axes, and creating a 3D stereoscopic image that represents a characteristic distribution of the microparticles, a step of displaying the 3D stereoscopic image, and a step of, for each of plural regions of the coordinate space, which are partitioned by a plane set by a user in the 3D stereoscopic image, computing variable values and/or a distribution frequency in the relevant region.

The following description is made on the basis of the foregoing embodiment by referring to FIGS. 1 and 2 again. The 3D data analysis program is stored and held in the hard disk 30 (see symbol 31 in FIG. 1). The 3D data analysis program is read into the memory 20 under control of the CPU 10 and the operating system (OS) 33. The 3D data analysis program then executes a process of creating the 3D stereoscopic image of the three-dimensional distribution map in the data processing unit 120 and a process of displaying the 3D stereoscopic image on the display unit 142.

The 3D data analysis program can be recorded on a recording medium that is readable by a computer. The recording medium is not limited particular one on condition that the recording medium is readable by a computer. For example, a disk-like recording medium, e.g., a flexible disk or a CD-ROM, is used as the recording medium. As another example, a tape-type recording medium, e.g., a magnetic tape, may also be used.

In one example embodiment, a data analysis apparatus comprises: a control unit configured to provide data representative of a three dimensional image, the three dimensional image including at least a three dimensional coordinate space which includes at least one plane that divides the three dimensional coordinate space into at least two regions; a display unit configured to produce the three dimensional image based on the data representative of the three dimensional image; and an input unit configured to provide data representative of at least one of a movement and a position of the at least one plane. In an example embodiment, first figures representing first data points are displayed in at least a first region and second figures representing second data points are displayed in at least a second region. In an example embodiment, the first figures are displayed as different shapes than the second figures. In an example embodiment, the first figures are displayed as hexahedrons and the second figures are displayed as octahedrons. In an example embodiment, the first figures are displayed in different colors than the second figures. In an example embodiment, the first figures and the second figures are displayed in different colors based on a distribution frequency. In an example embodiment, at least one of the first figures and the second figures are displayed as blinking. In an example embodiment, at least one of variable values and a distribution frequency are calculated for at least one of the first figures and the second figures in at least one region. In an example embodiment, the three dimensional coordinate space defines a distribution map for data analysis. In an example embodiment, the plane is moveable based on a user manipulation of the input unit to control an indicator figure that is located at a specific point of the three dimensional coordinate space. In an example embodiment, the input unit includes at least one of a mouse, a keyboard, a touchscreen, a track pad, a track ball, a touch panel, a joystick, a stylus, a microphone, a speech recognition unit, and a handheld controller. In an example embodiment, the at least one plane is semitransparent. In an example embodiment, the at least one plane is set perpendicular to a coordinate axis. In an example embodiment, the three dimensional coordinate space includes at least two planes that divide the three dimensional coordinate space into at least four regions. In an example embodiment, the three dimensional coordinate space includes at least three planes that divide the three dimensional coordinate space into at least eight regions. In an example embodiment, each of the at least three planes is moveable based on a user manipulation of the input unit. In an example embodiment, an indicator figure for moving each of the at least three planes is positioned at an intersection of the at least three planes, and the indicator figure is moveable based on a user manipulation of the input unit. In an example embodiment, the display unit produces at least two different viewpoints of the three dimensional coordinate space that are simultaneously displayed. In an example embodiment, the three dimensional image is moveable based on a user manipulation of the input unit to produce a different viewpoint of the three dimensional coordinate space. In an example embodiment, the three dimensional image is moveable by rotating, enlarging, or reducing the three dimensional image. In an example embodiment, the three dimensional image is constantly moving in at least one of a specific direction and an unspecific direction. In an example embodiment, the at least one plane is selectively displayed based on a user manipulation of the input unit. In an example embodiment, the at least one plane is set oblique to at least one coordinate axis. In an example embodiment, the data analysis apparatus is a microparticle data analysis apparatus. In an example embodiment, the microparticle data analysis apparatus displays microparticle measurement data measured by a flow cytometer. In an example embodiment, the three dimensional image is a stereoscopic three dimensional image.

In another example embodiment, a data analysis server comprises: a data storage unit configured to store measurement data; and a data processing unit configured to create data representative of a three dimensional image based on the measurement data, the three dimensional image including at least a three dimensional coordinate space which includes at least one plane that divides the three dimensional coordinate space into at least two regions, wherein the at least one plane is moveable based on data representative of at least one of a movement and a position of the at least one plane received from an input device. In an example embodiment, first figures representing first data points are displayed in at least a first region and second figures representing second data points are displayed in at least a second region. In an example embodiment, the first figures are displayed as different shapes than the second figures. In an example embodiment, the first figures are displayed as hexahedrons and the second figures are displayed as octahedrons. In an example embodiment, the first figures are displayed in different colors than the second figures. In an example embodiment, the first figures and the second figures are displayed in different colors based on a distribution frequency. In an example embodiment, at least one of the first figures and the second figures are displayed as blinking. In an example embodiment, at least one of variable values and a distribution frequency are calculated for at least one of the first figures and the second figures in at least one region. In an example embodiment, the three dimensional coordinate space defines a distribution map for data analysis. In an example embodiment, the plane is moveable based on a user manipulation of an input unit to control an indicator figure that is located at a specific point of the three dimensional coordinate space. In an example embodiment, an input unit includes at least one of a mouse, a keyboard, a touchscreen, a track pad, a track ball, a touch panel, a joystick, a stylus, a microphone, a speech recognition unit, and a handheld controller. In an example embodiment, the at least one plane is semitransparent. In an example embodiment, the at least one plane is set perpendicular to a coordinate axis. In an example embodiment, the three dimensional coordinate space includes at least two planes that divide the three dimensional coordinate space into at least four regions. In an example embodiment, the three dimensional coordinate space includes at least three planes that divide the three dimensional coordinate space into at least eight regions. In an example embodiment, each of the at least three planes is moveable based on a user manipulation of an input unit. In an example embodiment, an indicator figure for moving each of the at least three planes is positioned at an intersection of the at least three planes, and the indicator figure is moveable based on a user manipulation of an input unit. In an example embodiment, at least two different viewpoints of the three dimensional coordinate space are simultaneously displayed. In an example embodiment, the three dimensional image is moveable based on a user manipulation of an input unit to produce a different viewpoint of the three dimensional coordinate space. In an example embodiment, the three dimensional image is moveable by rotating, enlarging, or reducing the three dimensional image. In an example embodiment, the three dimensional image is constantly moving in at least one of a specific direction and an unspecific direction. In an example embodiment, the at least one plane is selectively displayed based on a user manipulation of an input unit. In an example embodiment, the at least one plane is set oblique to at least one coordinate axis. In an example embodiment, the measurement data is microparticle measurement data. In an example embodiment, the microparticle measurement data is measured by a flow cytometer. In an example embodiment, the three dimensional image is a stereoscopic three dimensional image.

In another example embodiment, a data analysis system comprises: a measurement apparatus; and a data analysis apparatus including: a control unit configured to provide data representative of a three dimensional image, the three dimensional image including at least a three dimensional coordinate space which includes at least one plane that divides the three dimensional coordinate space into at least two regions; a display unit configured to produce the three dimensional image based on the data representative of the three dimensional image; and an input unit configured to provide data representative of at least one of a movement and a position of the at least one plane. In an example embodiment, first figures representing first data points are displayed in at least a first region and second figures representing second data points are displayed in at least a second region. In an example embodiment, the first figures are displayed as different shapes than the second figures. In an example embodiment, the first figures are displayed as hexahedrons and the second figures are displayed as octahedrons. In an example embodiment, the first figures are displayed in different colors than the second figures. In an example embodiment, the first figures and the second figures are displayed in different colors based on a distribution frequency. In an example embodiment, at least one of the first figures and the second figures are displayed as blinking. In an example embodiment, at least one of variable values and a distribution frequency are calculated for at least one of the first figures and the second figures in at least one region. In an example embodiment, the three dimensional coordinate space defines a distribution map for data analysis. In an example embodiment, the plane is moveable based on a user manipulation of the input unit to control an indicator figure that is located at a specific point of the three dimensional coordinate space. In an example embodiment, the input unit includes at least one of a mouse, a keyboard, a touchscreen, a track pad, a track ball, a touch panel, a joystick, a stylus, a microphone, a speech recognition unit, and a handheld controller. In an example embodiment, the at least one plane is semitransparent. In an example embodiment, the at least one plane is set perpendicular to a coordinate axis. In an example embodiment, the three dimensional coordinate space includes at least two planes that divide the three dimensional coordinate space into at least four regions. In an example embodiment, the three dimensional coordinate space includes at least three planes that divide the three dimensional coordinate space into at least eight regions. In an example embodiment, each of the at least three planes is moveable based on a user manipulation of the input unit. In an example embodiment, an indicator figure for moving each of the at least three planes is positioned at an intersection of the at least three planes, and the indicator figure is moveable based on a user manipulation of the input unit. In an example embodiment, the display unit produces at least two different viewpoints of the three dimensional coordinate space that are simultaneously displayed. In an example embodiment, the three dimensional image is moveable based on a user manipulation of the input unit to produce a different viewpoint of the three dimensional coordinate space. In an example embodiment, the three dimensional image is moveable by rotating, enlarging, or reducing the three dimensional image. In an example embodiment, the three dimensional image is constantly moving in at least one of a specific direction and an unspecific direction. In an example embodiment, the at least one plane is selectively displayed based on a user manipulation of the input unit. In an example embodiment, the at least one plane is set oblique to at least one coordinate axis. In an example embodiment, the measurement apparatus is a microparticle measurement apparatus. In an example embodiment, the microparticle measurement apparatus is a flow cytometer. In an example embodiment, the three dimensional image is a stereoscopic three dimensional image.

In another example embodiment, a computer readable medium stores instructions which, when executed, cause a data analysis apparatus to: provide data representative of a three dimensional image, the three dimensional image including at least a three dimensional coordinate space which includes at least one plane that divides the three dimensional coordinate space into at least two regions; and receive an input providing data representative of at least one of a movement and a position of the at least one plane. In an example embodiment, first figures representing first data points are displayed in at least a first region and second figures representing second data points are displayed in at least a second region. In an example embodiment, the first figures are displayed as different shapes than the second figures. In an example embodiment, the first figures are displayed as hexahedrons and the second figures are displayed as octahedrons. In an example embodiment, the first figures are displayed in different colors than the second figures. In an example embodiment, the first figures and the second figures are displayed in different colors based on a distribution frequency. In an example embodiment, at least one of the first figures and the second figures are displayed as blinking. In an example embodiment, at least one of variable values and a distribution frequency are calculated for at least one of the first figures and the second figures in at least one region. In an example embodiment, the three dimensional coordinate space defines a distribution map for data analysis. In an example embodiment, the plane is moveable based on a user manipulation of an input unit to control an indicator figure that is located at a specific point of the three dimensional coordinate space. In an example embodiment, an input unit includes at least one of a mouse, a keyboard, a touchscreen, a track pad, a track ball, a touch panel, a joystick, a stylus, a microphone, a speech recognition unit, and a handheld controller. In an example embodiment, the at least one plane is semitransparent. In an example embodiment, the at least one plane is set perpendicular to a coordinate axis. In an example embodiment, the three dimensional coordinate space includes at least two planes that divide the three dimensional coordinate space into at least four regions. In an example embodiment, the three dimensional coordinate space includes at least three planes that divide the three dimensional coordinate space into at least eight regions. In an example embodiment, each of the at least three planes is moveable based on a user manipulation of an input unit. In an example embodiment, an indicator figure for moving each of the at least three planes is positioned at an intersection of the at least three planes, and the indicator figure is moveable based on a user manipulation of an input unit. In an example embodiment, at least two different viewpoints of the three dimensional coordinate space are simultaneously displayed. In an example embodiment, the three dimensional image is moveable based on a user manipulation of an input unit to produce a different viewpoint of the three dimensional coordinate space. In an example embodiment, the three dimensional image is moveable by rotating, enlarging, or reducing the three dimensional image. In an example embodiment, the three dimensional image is constantly moving in at least one of a specific direction and an unspecific direction. In an example embodiment, the at least one plane is selectively displayed based on a user manipulation of an input unit. In an example embodiment, the at least one plane is set oblique to at least one coordinate axis. In an example embodiment, the data analysis apparatus is a microparticle data analysis apparatus. In an example embodiment, the microparticle data analysis apparatus displays microparticle measurement data measured by a flow cytometer. In an example embodiment, the three dimensional image is a stereoscopic three dimensional image.

In another example embodiment, a 3D data analysis apparatus comprises: a data storage unit for storing measurement data of microparticles; an input unit for selecting three independent variables from the measurement data; a data processing unit for computing positions and figures in a coordinate space in which the three independent variables are set on coordinate axes, and creating a 3D stereoscopic image that represents a characteristic distribution of the microparticles; and a display unit for displaying the 3D stereoscopic image, wherein a plane for partitioning the coordinate space into plural regions is set in a position changeable manner and is displayed in the 3D stereoscopic image in accordance with an input signal from the input unit. In an example embodiment, the data processing unit computes variable values and/or a distribution frequency in the region, and the display unit displays information regarding the variable values and/or the distribution frequency. In an example embodiment, the plane is displayed semitransparent in the 3D stereoscopic image such that the figure positioned on a deeper side than the plane can be observed when the image is observed in a stereoscopic view. In an example embodiment, regarding the 3D stereoscopic image, the plane is displayed in the 3D stereoscopic image only when a signal is input from the input unit, or whether the plane is to be displayed or not in the 3D stereoscopic image is selectable in accordance with an input signal from the input unit. In an example embodiment, the 3D stereoscopic image is rotated on the display unit in accordance with an input signal from the input unit such that the image can be observed in a stereoscopic view from a direction of the optionally selected coordinate axis. In an example embodiment, the plane is a plane perpendicular to the coordinate axis, and a position of the plane is changed when an indicator figure, which is arranged at an intersection of the plane and the coordinate axis, is moved in accordance with an input signal from the input unit. In an example embodiment, the plane comprises three planes perpendicular respectively to the coordinate axes, and positions of the three planes are changed together when an indicator figure, which is arranged at an intersection of the three planes, is moved in accordance with an input signal from the input unit.

In another example embodiment, a microparticle analysis system comprises: a 3D data analysis apparatus including a data storage unit for storing measurement data of microparticles, an input unit for selecting three independent variables from the measurement data, a data processing unit for computing positions and figures in a coordinate space in which the three independent variables are set on coordinate axes, and creating a 3D stereoscopic image that represents a characteristic distribution of the microparticles, and a display unit for displaying the 3D stereoscopic image, wherein a plane for partitioning the coordinate space into plural regions is set in a position changeable manner and is displayed in the 3D stereoscopic image in accordance with an input signal from the input unit, and a microparticle measurement apparatus disposed in association with the 3D data analysis apparatus.

In another example embodiment, a 3D data analysis method comprises: a procedure of selecting three independent variables from measurement data of microparticles; a procedure of computing positions and shapes in a coordinate space in which the three independent variables are set on coordinate axes, and creating a 3D stereoscopic image that represents a characteristic distribution of the microparticles; a procedure of displaying the 3D stereoscopic image; and a procedure of setting, in the 3D stereoscopic image, a plane for partitioning the coordinate space into plural regions.

In another example embodiment, a 3D data analysis program causes a computer to execute: a step of computing positions and shapes in a coordinate space in which three independent variables selected from measurement data of microparticles are set on coordinate axes, and creating a 3D stereoscopic image that represents a characteristic distribution of the microparticles; a step of displaying the 3D stereoscopic image; and a step of, for each of plural regions of the coordinate space, which are partitioned by a plane set by a user on the 3D stereoscopic image, computing variable values and/or a distribution frequency in the relevant region.

With the 3D data analysis apparatus according to the present technique, even for a sample which is difficult to analyze by using the known apparatus using the histogram or the cytogram, accurate analysis results can be obtained by setting regions for a data analysis while looking at, in a stereoscopic view, a three-dimensional distribution map in which three optionally selected parameters are set on coordinate axes. Therefore, in cooperation with a flow cytometer, for example, the 3D data analysis apparatus according to the present technique can be used to easily and high-accurately analyze characteristics of cells and microorganisms in the fields of medical cares, public hygiene, and development of new medicines.

1: 3D data analysis apparatus, 10: central processing unit, 110: control unit, 120: data processing unit, 130: data storage unit, 141: input unit, 142: display unit, 150: input/output interface, 2: flow cytometer, 20: memory, 210: control unit, 220: flow system, 230: detection system, 231: optical detection unit, 232: electrical detection unit, 240: fractionation unit, 250: input/output interface, 3: microparticle analysis system, 30: hard disk, 31: 3D data analysis program, 32: measurement data, 33: operating system, 4: communication cable, 41: mouse, 42: keyboard, 43: display, 44: printer, 5: three-dimensional distribution map, 51, 52, 53: guide planes, 511, 521, 531, 541: indicator figures, 6: coordinate space, 61, 62, 63, 64, 65, 66, 67, 68: regions, 7: figure, 8: shutter spectacles.

It should be understood by those skilled in the art that various modifications, combinations, sub-combinations and alterations may occur depending on design requirements and other factors insofar as they are within the scope of the appended claims or the equivalents thereof.

The application is claimed as follows:

1. A data analysis apparatus to analyze microparticle data measured from a flow cytometer comprising:
   a processor configured to produce a three dimensional image based on data representative of the three dimensional image, and the three dimensional image represents a characteristic distribution of microparticles in a coordinate space which includes a first coordinate axis, a second coordinate axis, a third coordinate axis, and at least two planes that divide the three dimensional coordinate space into at least four regions, wherein a first plane intersects the first coordinate axis and partitions the three dimensional coordinate space into a first side and a second side by extending across the three dimensional coordinate space, and a second plane intersects the second coordinate axis and partitions the three dimensional coordinate space into a third side and a fourth side by extending across the three dimensional coordinate space,
   wherein the three dimensional image includes graphics corresponding to the microparticles in the coordinate space including a first region with first graphics representing first data points measured from the flow cytometer, a second region with second graphics representing second data points measured from the flow cytometer, and a third region with third graphics representing third data points measured from the flow cytometer, and
   wherein the coordinate space defines a distribution map for data analysis,
   wherein the graphics are displayed in at least one of a different color, size, shape, and mass, and the first graphics are displayed differently than the second graphics and the third graphics, and the second graphics are displayed differently than the third graphics, and
   wherein the distribution map is configured to analyze the microparticle data.

2. The data analysis apparatus of claim 1, further comprising a display configured to produce the three dimensional image based on the data representative of the three dimensional image.

3. The data analysis apparatus of claim 1, further comprising an input unit configured to provide data representative of at least one of a movement and a position of at least one plane within the coordinate space.

4. The data analysis apparatus of claim 1, wherein a first distribution frequency is calculated for a first region and a second distribution frequency is calculated for a second region.

5. The data analysis apparatus of claim 1, wherein at least two regions of the graphics are displayed in different color and size.

6. The data analysis apparatus of claim 1, wherein the first graphics, the second graphics, and the third graphics are each positioned within the three dimensional coordinate space based on parameter values of the first coordinate axis, the second coordinate axis, and the third coordinate axis.

7. The data analysis apparatus of claim 1, wherein the graphics include first figures displayed as different shapes than second figures.

8. The data analysis apparatus of claim 1, wherein the graphics include first figures and second figures displayed in different colors based on a distribution frequency.

9. The data analysis apparatus of claim 1, wherein the graphics include at least one of first figures and second figures that are displayed as blinking.

10. The data analysis apparatus of claim 1, wherein at least one plane in the coordinate space is moveable to control an indicator figure located at a specific point of the coordinate space.

11. The data analysis apparatus of claim 1, wherein at least one plane in the coordinate space is semitransparent.

12. The data analysis apparatus of claim 1, wherein at least one plane in the coordinate space is set perpendicular to a coordinate axis.

13. The data analysis apparatus of claim 1, wherein the three dimensional image is a stereoscopic three dimensional image.

14. A data analysis server to analyze microparticle data measured from a flow cytometer comprising:
a memory configured to store measurement data; and
a processor configured to produce a three dimensional image based on data representative of the three dimensional image, and the three dimensional image represents a characteristic distribution of microparticles in a coordinate space which includes a first coordinate axis, a second coordinate axis, a third coordinate axis, and at least two planes that divide the three dimensional coordinate space into at least four regions, wherein a first plane intersects the first coordinate axis and partitions the three dimensional coordinate space into a first side and a second side by extending across the three dimensional coordinate space, and a second plane intersects the second coordinate axis and partitions the three dimensional coordinate space into a third side and a fourth side by extending across the three dimensional coordinate space,
wherein the three dimensional image includes graphics corresponding to the microparticles in the coordinate space including a first region with first graphics representing first data points measured from the flow cytometer, a second region with second graphics representing second data points measured from the flow cytometer, and a third region with third graphics representing third data points measured from the flow cytometer, and
wherein the coordinate space defines a distribution map for data analysis,
wherein the graphics are displayed in at least one of a different color, size, shape, and mass, and the first graphics are displayed differently than the second graphics and the third graphics, and the second graphics are displayed differently than the third graphics, and
wherein the distribution map is configured to analyze the microparticle data.

15. A non-transitory computer readable medium storing instructions which, when executed, cause a data analysis apparatus to analyze microparticle data measured from a flow cytometer to:
produce a three dimensional image based on data representative of the three dimensional image, and the three dimensional image represents a characteristic distribution of microparticles in a coordinate space which includes a first coordinate axis, a second coordinate axis, a third coordinate axis, and at least two planes that divide the three dimensional coordinate space into at least four regions, wherein a first plane intersects the first coordinate axis and partitions the three dimensional coordinate space into a first side and a second side by extending across the three dimensional coordinate space, and a second plane intersects the second coordinate axis and partitions the three dimensional coordinate space into a third side and a fourth side by extending across the three dimensional coordinate space,
wherein the three dimensional image includes graphics corresponding to the microparticles in the coordinate space including a first region with first graphics representing first data points measured from the flow cytometer, a second region with second graphics representing second data points measured from the flow cytometer, and a third region with third graphics representing third data points measured from the flow cytometer, and
wherein the coordinate space defines a distribution map for data analysis,
wherein the graphics are displayed in at least one of a different color, size, shape, and mass, and the first graphics are displayed differently than the second graphics and the third graphics, and the second graphics are displayed differently than the third graphics, and
wherein the distribution map is configured to analyze the microparticle data.

\* \* \* \* \*